(12) United States Patent
Ghosh et al.

(10) Patent No.: US 12,284,674 B2
(45) Date of Patent: Apr. 22, 2025

(54) SYSTEMS AND METHODS OF WIRELESS MEDIUM ACCESS RECOVERY

(71) Applicant: Meta Platforms Technologies, LLC, Menlo Park, CA (US)

(72) Inventors: Chittabrata Ghosh, Fremont, CA (US); Chunyu Hu, Saratoga, CA (US); Muhammad Kumail Haider, Sunnyvale, CA (US)

(73) Assignee: Meta Platforms Technologies, LLC

( * ) Notice: Subject to any disclaimer, the term of this patent is extended or adjusted under 35 U.S.C. 154(b) by 492 days.

(21) Appl. No.: 17/842,294

(22) Filed: Jun. 16, 2022

(65) Prior Publication Data

US 2023/0043667 A1 Feb. 9, 2023

Related U.S. Application Data

(60) Provisional application No. 63/225,692, filed on Jul. 26, 2021, provisional application No. 63/223,395, filed on Jul. 19, 2021.

(51) Int. Cl.
*H04W 74/0808* (2024.01)
*H04L 5/00* (2006.01)
*H04W 74/00* (2009.01)

(52) U.S. Cl.
CPC ....... *H04W 74/0808* (2013.01); *H04L 5/0055* (2013.01); *H04W 74/002* (2013.01)

(58) Field of Classification Search
CPC ........... H04W 74/0808; H04W 74/002; H04W 74/08; H04L 5/0055
See application file for complete search history.

(56) References Cited

U.S. PATENT DOCUMENTS

| | | | |
|---|---|---|---|
| 2023/0140556 A1* | 5/2023 | Ko | H04W 76/15 370/329 |
| 2023/0209600 A1* | 6/2023 | Guo | H04W 56/002 370/329 |
| 2023/0422188 A1* | 12/2023 | Fischer | H04L 1/08 |

OTHER PUBLICATIONS

Fischer M., "MLO-Synch Transmission," IEEE Draft, 11-20-0081-03-00BE-MLO-SYNCHTRANSMISSION, vol. 802.11 EHT, 802. 11 be, No. 3, Jan. 2020, 59 pages.

(Continued)

*Primary Examiner* — Habte Mered
(74) *Attorney, Agent, or Firm* — FOLEY & LARDNER LLP

(57) ABSTRACT

A first device within a multi-link device having a plurality of wireless links including a first link and a second link, may include one or more processors configured to receive a first frame on the first link while communicating with a second device for transmission of a second frame on the second link. The one or more processors may decode a portion of the first frame to determine a first duration of no medium access. The one or more processors may determine, a second duration comprising a remaining transmission duration on the second link. The one or more processors may determine whether the first duration is greater than or equal to the second duration. In response to the first duration being greater than or equal to the second duration, the one or more processors may defer channel access on the first link until an end of the first duration.

20 Claims, 14 Drawing Sheets

1300

Receiving, by a first device within a multi-link device having a plurality of wireless links, a first frame in a first link of the plurality of wireless links, while communicating with a second device for transmission of a second frame in a second link of the plurality of wireless links 1302

Decoding, by the first device, a portion of the first frame to determine a first duration of no medium access, the portion being a legacy preamble, a TXOP field, or a duration field in a MAC header 1304

Determining, by the first device, a second duration comprising a remaining transmission duration on the second link 1306

Determining, by the first device, whether the first duration is greater than or equal to the second duration 1308

In response to the first duration being greater than or equal to the second duration, deferring, by the first device, channel access on the first link until an end of the first duration 1310

(56) References Cited

OTHER PUBLICATIONS

Guo J.Y., et al., "Proposed Draft Text for Short Frame in Blindness Issue," IEEE P802.11Wireless LANs, vol. 802.11 EHT, 802.11 be, No. 1, Mar. 27, 2021, 3 pages.
International Search report and Written Opinion for International Application No. PCT/US2022/037564, mailed Oct. 13, 2022, 9 pages.

* cited by examiner

SYSTEMS AND METHODS OF WIRELESS MEDIUM ACCESS RECOVERY

CROSS-REFERENCE TO RELATED APPLICATION

This application claims priority to U.S. Provisional Patent Application No. 63/223,395 filed on Jul. 19, 2021 and U.S. Provisional Patent Application No. 63/225,692 filed on Jul. 26, 2021, which are incorporated by reference herein in its entirety for all purposes.

FIELD OF DISCLOSURE

The present disclosure is generally related to communications, including but not limited systems and methods of avoiding/bypassing/skipping a medium access recovery procedure for stations (STAs) in a non-simultaneous transmit and receive (NSTR) multi-link devices (MLD), or a medium access recovery procedure for enhanced multi-link single radio (eMLSR) STAs or Soft AP MLD.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space). An image of a virtual object may be generated by a console communicatively coupled to the HWD. In some embodiments, the console may have access to a network.

SUMMARY

Various embodiments disclosed herein are related to a first device within a multi-link device having a plurality of wireless links including a first link and a second link. In some embodiments, the first device may include one or more processors. The one or more processors may be configured to receive a first frame on the first link while communicating with a second device for transmission of a second frame on the second link. The one or more processors may be configured to decode a portion of the first frame to determine a first duration of no medium access. The one or more processors may be configured to determine, a second duration comprising a remaining transmission duration on the second link. The one or more processors may be configured to determine whether the first duration is greater than or equal to the second duration. In response to the first duration being greater than or equal to the second duration, The one or more processors may be configured to defer, channel access on the first link until an end of the first duration. In some embodiments, in response to the first duration being greater than or equal to the second duration, or the portion being received at or after an end of the transmission of the second frame or an associated downlink or acknowledgement frame, the one or more processors may be configured to defer channel access on the first link until an end of the first duration.

In some embodiments, in response to the first duration being smaller than the second duration, the one or more processors may be configured to defer the channel access until after a predetermined time elapses from an end of the transmission of the second frame. In some embodiments, in response to the first duration being smaller than the second duration, the one or more processors may be configured to defer the channel access until an end of the transmission of the second frame and then initiate a medium access recovery process on the first link.

In some embodiments, the first duration may be a physical layer protocol data unit (PPDU) duration of a legacy preamble of the first frame. In some embodiments, the portion of the first frame may be a transmit opportunity (TXOP) field of the first frame. In some embodiments, the portion of the first frame may be a duration field of a medium access control (MAC) header of the first frame.

In some embodiments, the second frame may include a clear-to-send frame or a buffer status report frame. The one or more processors may be configured to transmit an acknowledgment frame to the second device at or after an end of the transmission of the second frame. In response to the first duration being smaller than the second duration, the one or more processors may be configured to defer the channel access until after a predetermined time elapses from an end of the transmission of the acknowledgment frame. The one or more processors may be configured to transmit an acknowledgment frame to the second device at or after an end of the transmission of the second frame. In response to the first duration being smaller than the second duration, the one or more processors may be configured to defer the channel access until an end of the transmission of the acknowledgment frame and then initiate a medium access recovery process.

Various embodiments disclosed herein are related to a method including receiving, by a first device within a multi-link device having a plurality of wireless links, a first frame on a first link of the plurality of wireless links, while communicating with a second device for transmission of a second frame on a second link of the plurality of wireless links. The method may include decoding, by the first device, a portion of the first frame to determine a first duration of no medium access. The method may include determining, by the first device, a second duration comprising a remaining transmission duration on the second link. The method may include determining, by the first device, whether the first duration is greater than or equal to the second duration. The method may include in response to the first duration being greater than or equal to the second duration, deferring, by the first device, channel access on the first link until an end of the first duration. In some embodiments, in response to the first duration being greater than or equal to the second duration, or the portion being received at or after an end of the transmission of the second frame or an associated downlink or acknowledgement frame, the first device may defer channel access on the first link until an end of the first duration.

In some embodiments, in response to the first duration being smaller than the second duration, the first device may defer the channel access until after a predetermined time elapses from an end of the transmission of the second frame. In some embodiments, in response to the first duration being smaller than the second duration, the first device may defer the channel access until an end of the transmission of the second frame and then initiate a medium access recovery process on the first link.

In some embodiments, the first duration may be a physical layer protocol data unit (PPDU) duration of a legacy preamble of the first frame. In some embodiments, the portion of the first frame may be a transmit opportunity (TXOP)

field of the first frame. In some embodiments, the portion of the first frame may be a duration field of a medium access control (MAC) header of the first frame.

In some embodiments, the second frame may include a clear-to-send frame or a buffer status report frame. The first device may transmit an acknowledgment frame to the second device at or after an end of the transmission of the second frame. In response to the first duration being smaller than the second duration, the first device may defer the channel access until after a predetermined time elapses from an end of the transmission of the acknowledgment frame. The first device may transmit an acknowledgment frame to the second device at or after an end of the transmission of the second frame. In response to the first duration being smaller than the second duration, the first device may defer the channel access until an end of the transmission of the acknowledgment frame and then initiate a medium access recovery process.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
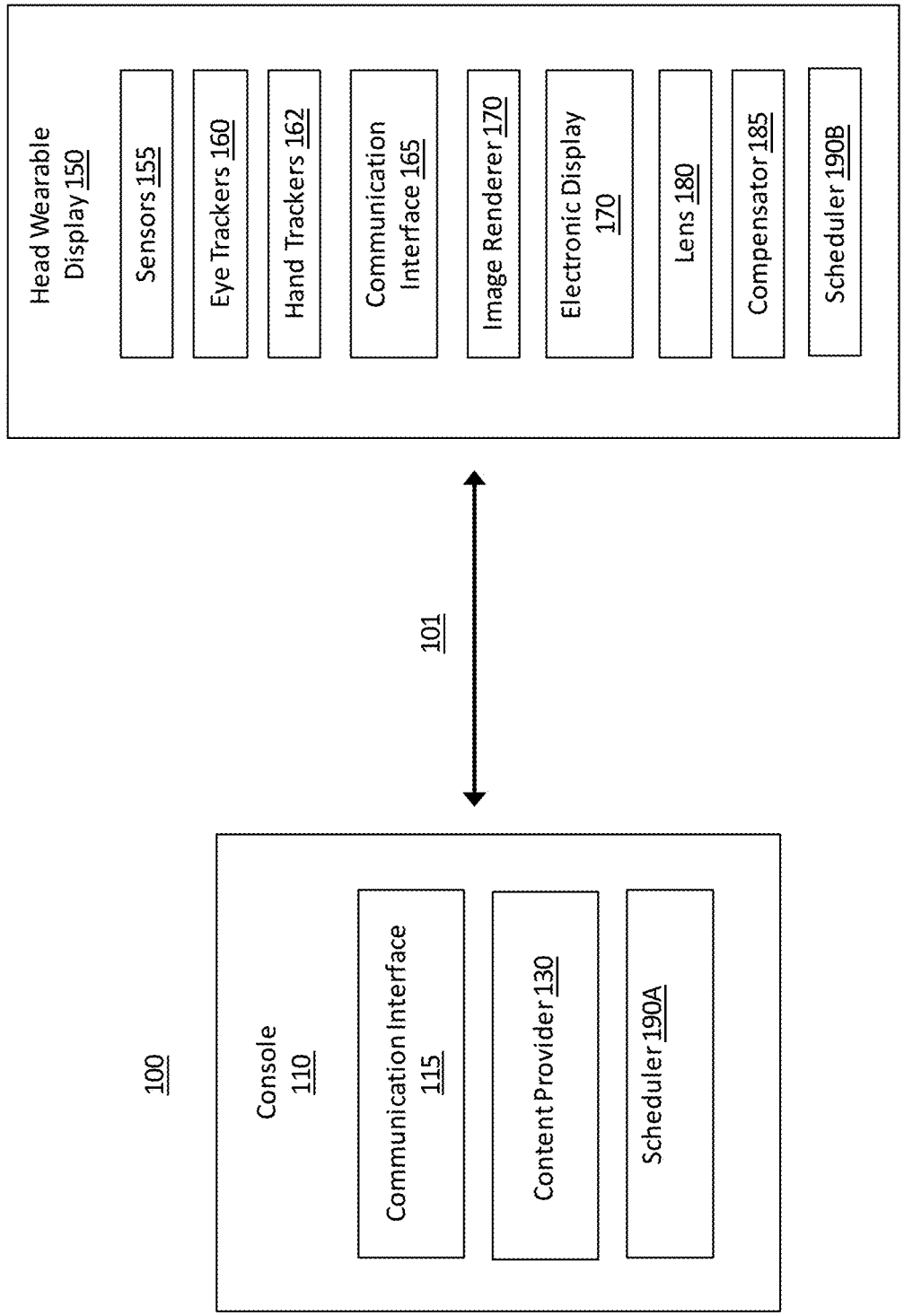
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

In a non-simultaneous Transmit and Receive (NSTR) operation, a STA MLD (multi-link station/device) having a pair of STAs may transmit a frame (e.g., Association Request) to the other STA of STA MLD on one of a pair of NSTR links. For example, a first link of the pair of links uses a lower 5 GHz band while a second link of the pair of links uses a band of upper 5 GHz, or 6 GHz. In this case, the STA that is transmitting on the first link (e.g., lower 5 GHz band) may impose self-interference (due to signal leakage) on the second link (e.g., upper 5 GHz or 6 GHz) within the pair of NSTR links, thereby making the second link unsuitable for reception of a physical layer protocol data unit (PPDU) or packet at the other STA of the same NSTR MLD. This self-interference results in medium blindness for the STA on the second link so that the STA cannot receive or decode packets on the second link, and the two links cannot operate at the same time. This duration of medium blindness in one link (e.g., the second link) for a STA may be defined as a duration of lost medium synchronization. A medium access recovery is a scheme or mechanism or procedure to let/allow/enable the STA to come out of the medium blindness and access the medium again on the second link. In some cases, a medium access recovery procedure may incur an unnecessary and significant delay for the STA to re-access the medium on the second link. The present disclosure is related to systems and methods of avoiding/bypassing/skipping a medium access recovery procedure for STAs in an NSTR MILD.

In another scenario, an enhanced multi-link single radio (eMLSR)) device may be used to exchange frames on multiple channels. In some implementations, an eMLSR STA (e.g., a non-AP MLD) may listen to two (or more) pre-configured channels simultaneously. For example, 2×2 (two transmit (TX) antennas and two receive (RX) antennas) Tx/Rx module may be configured to 1×1 on each channel/band (e.g. 5 GHz and 6 GHz) to listen to incoming packets on each channel. In some implementations, a 1×1 STA on one channel may add an extra 1×1 Rx on the other channel and listen to two channels for incoming packets. Listening operations may relate to CCA (Clear Channel Assessment) and the STA in an eMLSR MLD can receive an initial control frame of a frame exchange initiated by an AP of an AP MLD in one link. Initial control frames may be transmitted in a non-HT (high-throughput) duplicate or OFDM (orthogonal frequency-division multiplexing) PPDU (Physical Layer Protocol Data Unit) with a rate of 6/12/24 Mbps. Initial control frames may be either a multi user request to send (MU-RTS) or a buffer status report poll trigger frame (BSRP TF).

An AP MLD may transmit a control frame (e.g. RTS or MU-RTS) on any idle channel of the pre-configured channels before a data frame transmission. The control frame may indicate to the STA of an eMLSR MLD which channel is be used for data transmission, and upon reception of the control frame, the STA may respond with a control frame (e.g. clear-to-send (CTS)). Data transmission can follow the response from the STA of an eMLSR MLD. After reception of a control frame on one link, the corresponding 1×1 STA within the eMLSR MLD may transmit or receive frames (with 2 SS (slave-select) activated) on the same link SIFS (Short Interframe Space) time after the response frame (solicited by initial control frame). At this time, transmission or reception of frames on other enabled links may be prohibited. Upon transmission or reception of frames, after a switching delay, the 1×1 STAs within a non-AP MLD can return to a listen mode immediately after end of frame exchange sequence. In this manner, the eMLSR STA and the AP MLD can exchange frames on one link at a time.

This eMLSR operation results in medium blindness for the 1×1 STA (within the eMLSR STA) in other link so that the other 1×1 STA of the same eMLSR MLD cannot receive or decode packets on the other link, and the two links cannot operate at the same time. This duration of medium blindness in one link (e.g., the other link) for a 1×1 STA may be defined as a duration of lost medium synchronization. A medium access recovery can let/allow/enable the 1×1 STA to come out of the medium blindness and access the medium again on the other link. As described above, a medium access recovery procedure may incur an unnecessary and significant delay for the 1×1 STA to re-access the medium on the other link. The present disclosure is related to systems and methods of avoiding/bypassing/skipping a medium access recovery procedure for 1×1 STAs within an eMLSR STA.

FIG. 1 is a block diagram of an example artificial reality system environment 100 in which a console 110 operates. FIG. 1 provides an example environment in which devices may communicate traffic streams with different latency sensitivities/requirements. In some embodiments, the artificial reality system environment 100 includes a HWD 150 worn by a user, and a console 110 providing content of artificial reality to the HWD 150. A head wearable display (HWD) may be referred to as, include, or be part of a head mounted display (HMD), head mounted device (HMD), head wearable device (HWD), head worn display (HWD) or head worn device (HWD). In one aspect, the HWD 150 may include various sensors to detect a location, an orientation, and/or a gaze direction of the user wearing the HWD 150, and provide the detected location, orientation and/or gaze direction to the console 110 through a wired or wireless connection. The HWD 150 may also identify objects (e.g., body, hand face).

The console 110 may determine a view within the space of the artificial reality corresponding to the detected location, orientation and/or the gaze direction, and generate an image depicting the determined view. The console 110 may also receive one or more user inputs and modify the image according to the user inputs. The console 110 may provide the image to the HWD 150 for rendering. The image of the space of the artificial reality corresponding to the user's view can be presented to the user. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150, and/or some of the functionality of the HWD 150 may be performed by the console 110.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a communication interface 165, an image renderer 170, an electronic display 175, a lens 180, and a compensator 185. These components may operate together to detect a location of the HWD 150 and/or a gaze direction of the user wearing the HWD 150, and render an image of a view within the artificial reality corresponding to the detected location of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location and/or an orientation of the HWD 150. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and/or the rotational movement, and determine an orientation and location of the HWD 150. In one aspect, the sensors 155 can detect the translational movement and/or the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110 or a combination may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gaze direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and/or an orientation of the hand. The hand tracker 162 may generate hand tracking measurements indicating the detected shape, location and/or orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In embodiments in which the console 110 and the head wearable display 150 are implemented on a single system, the communication interface 165 may communicate with the console 110 through a bus connection or a conductive trace. Through the communication link, the communication interface 165 may transmit to the console 110 sensor measurements indicating the determined location of the HWD 150, orientation of the HWD 150, the determined gaze direction of the user, and/or hand tracking measurements. Moreover, through the communication link, the communication interface 165 may receive from the console 110 sensor measurements indicating or corresponding to an image to be rendered.

Using the communication interface, the console 110 (or HWD 150) may coordinate operations on link 101 to reduce collisions or interferences. For example, the console 110 may coordinate communication between the console 110 and the HWD 150. In some implementations, the console 110 may transmit a beacon frame periodically to announce/advertise a presence of a wireless link between the console 110 and the HWD 150 (or between two HWDs). In an implementation, the HWD 150 may monitor for or receive the beacon frame from the console 110, and can schedule communication with the HWD 150 (e.g., using the information in the beacon frame, such as an offset value) to avoid collision or interference with communication between the console 110 and/or HWD 150 and other devices.

The console 110 and HWD 150 may communicate using link 101 (e.g., intralink). Data (e.g., a traffic stream) may flow in a direction on link 101. For example, the console 110 may communicate using a downlink (DL) communication to the HWD 150 and the HWD 150 may communicate using an uplink (UL) communication to the console 110.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, data describing an image to be rendered, and render the image through the electronic display 175. In some embodiments, the data from the console 110 may be encoded, and the image renderer 170 may decode the data to generate and render the image. In one aspect, the image renderer 170 receives the encoded image from the console 110, and decodes the encoded image, such that a communication bandwidth between the console 110 and the HWD 150 can be reduced.

In some embodiments, the image renderer 170 receives, from the console, 110 additional data including object information indicating virtual objects in the artificial reality space and depth information indicating depth (or distances from the HWD 150) of the virtual objects. Accordingly, the image renderer 170 may receive from the console 110 object information and/or depth information. The image renderer 170 may also receive updated sensor measurements from the sensors 155. The process of detecting, by the HWD 150, the location and the orientation of the HWD 150 and/or the gaze direction of the user wearing the HWD 150, and generating and transmitting, by the console 110, a high resolution image (e.g., 1920 by 1080 pixels, or 2048 by 1152 pixels) corresponding to the detected location and the gaze direction to the HWD 150 may be computationally exhaustive and may not be performed within a frame time (e.g., less than 11 ms or 8 ms).

In some implementations, the image renderer 170 may perform shading, reprojection, and/or blending to update the image of the artificial reality to correspond to the updated location and/or orientation of the HWD 150. Assuming that a user rotated their head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality.

In other implementations, the image renderer 170 generates one or more images through a shading process and a reprojection process when an image from the console 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the pre-distorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a field of view (FOV) of the user) of the artificial reality corresponding to the location of the HWD 150 and/or the gaze direction of the user of the HWD 150, and can generate an image of the artificial reality corresponding to the determined view. In other embodiments, the console 110 includes more, fewer, or different components than shown in FIG. 1. In some embodiments, the console 110 is integrated as part of the HWD 150. In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., USB cable, a wireless link). Through the communication link, the communication interface 115 may receive from the HWD 150 sensor measurements indicating the determined location and/or orientation of the HWD 150, the determined gaze direction of the user, and/or hand tracking measurements. Moreover, through the communication link, the communication interface 115 may transmit to the HWD 150 data describing an image to be rendered.

The content provider 130 can include or correspond to a component that generates content to be rendered according to the location and/or orientation of the HWD 150, the gaze direction of the user and/or hand tracking measurements. In one aspect, the content provider 130 determines a view of the artificial reality according to the location and orientation of the HWD 150 and/or the gaze direction of the user of the HWD 150. For example, the content provider 130 maps the location of the HWD 150 in a physical space to a location within an artificial reality space, and determines a view of the artificial reality space along a direction corresponding to an orientation of the HWD 150 and/or the gaze direction of the user from the mapped location in the artificial reality space.

The content provider 130 may generate image data describing an image of the determined view of the artificial reality space, and transmit the image data to the HWD 150 through the communication interface 115. The content provider may also generate a hand model (or other virtual object) corresponding to a hand of the user according to the hand tracking measurement, and generate hand model data indicating a shape, a location, and an orientation of the hand model in the artificial reality space.

In some embodiments, the content provider 130 generates metadata including motion vector information, depth information, edge information, object information, etc., associated with the image, and transmits the metadata with the image data to the HWD 150 through the communication interface 115. The content provider 130 may encode and/or encode the data describing the image, and can transmit the encoded and/or encoded data to the HWD 150. In some embodiments, the content provider 130 generates and provides the image to the HWD 150 periodically (e.g., every one second).

Figure 2:
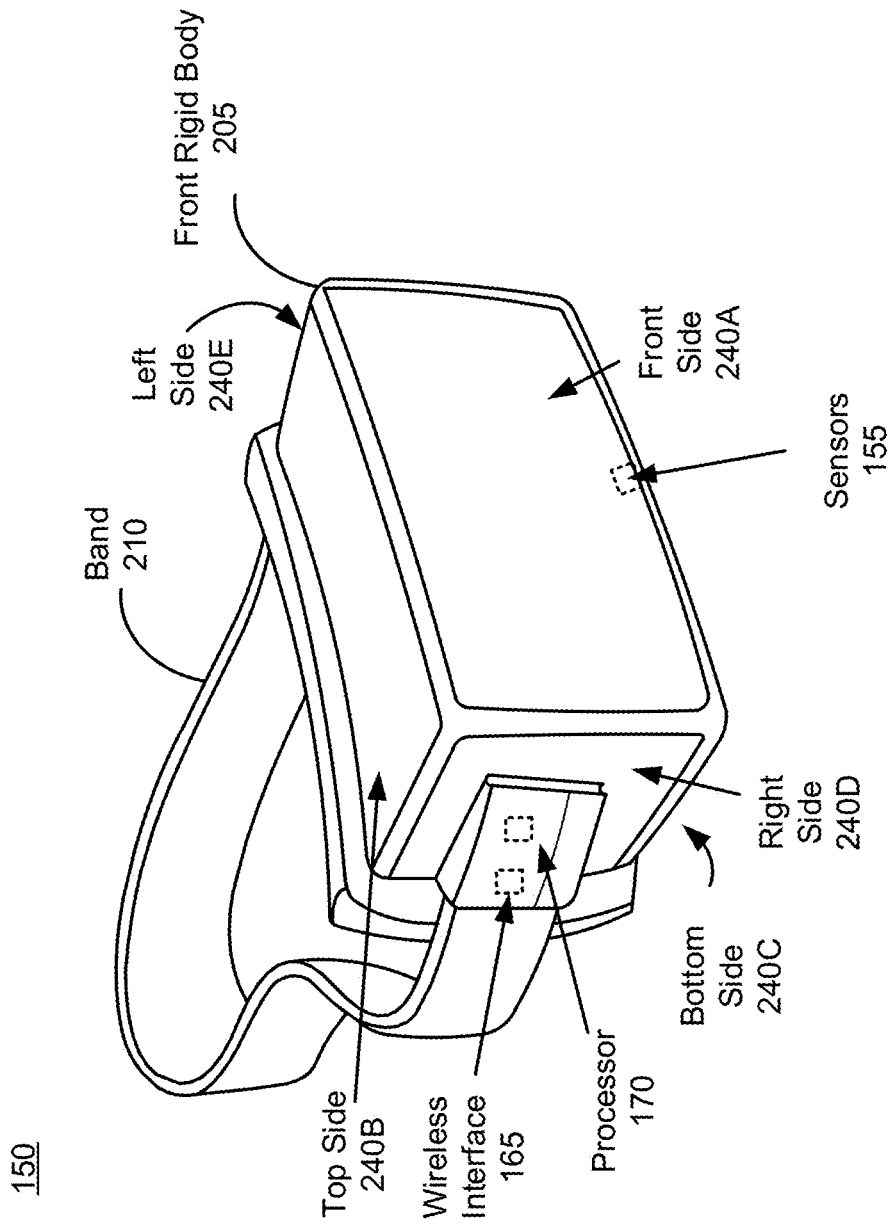
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the sensors 155 are located within the front rigid body 205, and may not visible to the user. In other embodiments, the HWD 150 has a different configuration than shown in FIG. 2. For example, the image renderer 170, the eye trackers 160A, 160B, and/or the sensors 155 may be in different locations than shown in FIG. 2.

Figure 3:
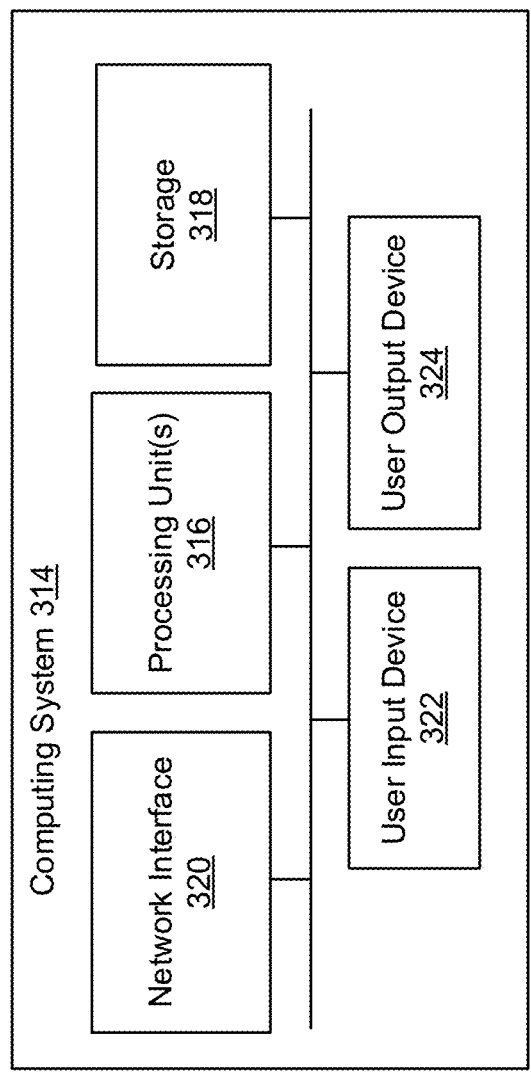
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

The network interface 320 may include a transceiver to allow the computing system 314 to transmit and receive data from a remote device (e.g., an AP, a STA) using a transmitter and receiver. The transceiver may be configured to support transmission/reception supporting industry standards that enables bi-directional communication. An antenna may be attached to transceiver housing and electrically coupled to the transceiver. Additionally or alternatively, a multi-antenna array may be electrically coupled to the transceiver such that a plurality of beams pointing in distinct directions may facilitate in transmitting and/or receiving data.

A transmitter may be configured to wirelessly transmit frames, slots, or symbols generated by the processor unit 316. Similarly, a receiver may be configured to receive frames, slots or symbols and the processor unit 316 may be configured to process the frames. For example, the processor unit 316 can be configured to determine a type of frame and to process the frame and/or fields of the frame accordingly.

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

One problem relates to avoiding/bypassing/skipping a medium access recovery procedure for STAs in an NSTR MLD because a medium access recovery procedure may incur an unnecessary and significant delay for the STA to re-access the medium on a link which has been subject to medium blindness. One approach to implement a medium access recovery procedure is to (1) identify one STA (first STA) affiliated with a non-AP MLD that belongs to a pair of NSTR links (first link and second link), as having lost medium synchronization on the second link of the NSTR link pair due to self-interference on the first link, when the first STA (or one or more devices) of the same NSTR MLD transmits a packet (TX packet) to a STA on the first link, and the second STA, which is affiliated with the same MLD and belongs to that link pair, receives a PPDU or packet (RX packet) on the second link, (2) except that both STAs end the transmissions at the same time, and then (3) perform a medium access recovery procedure by causing the first STA (which has lost medium synchronization due to transmission by the second STA) to start a medium synchronization delay (MediumSyncDelay) timer at the end of that transmission event if that transmission event is longer than a medium synchronization threshold (MediumSyncThreshold).

Figure 4:
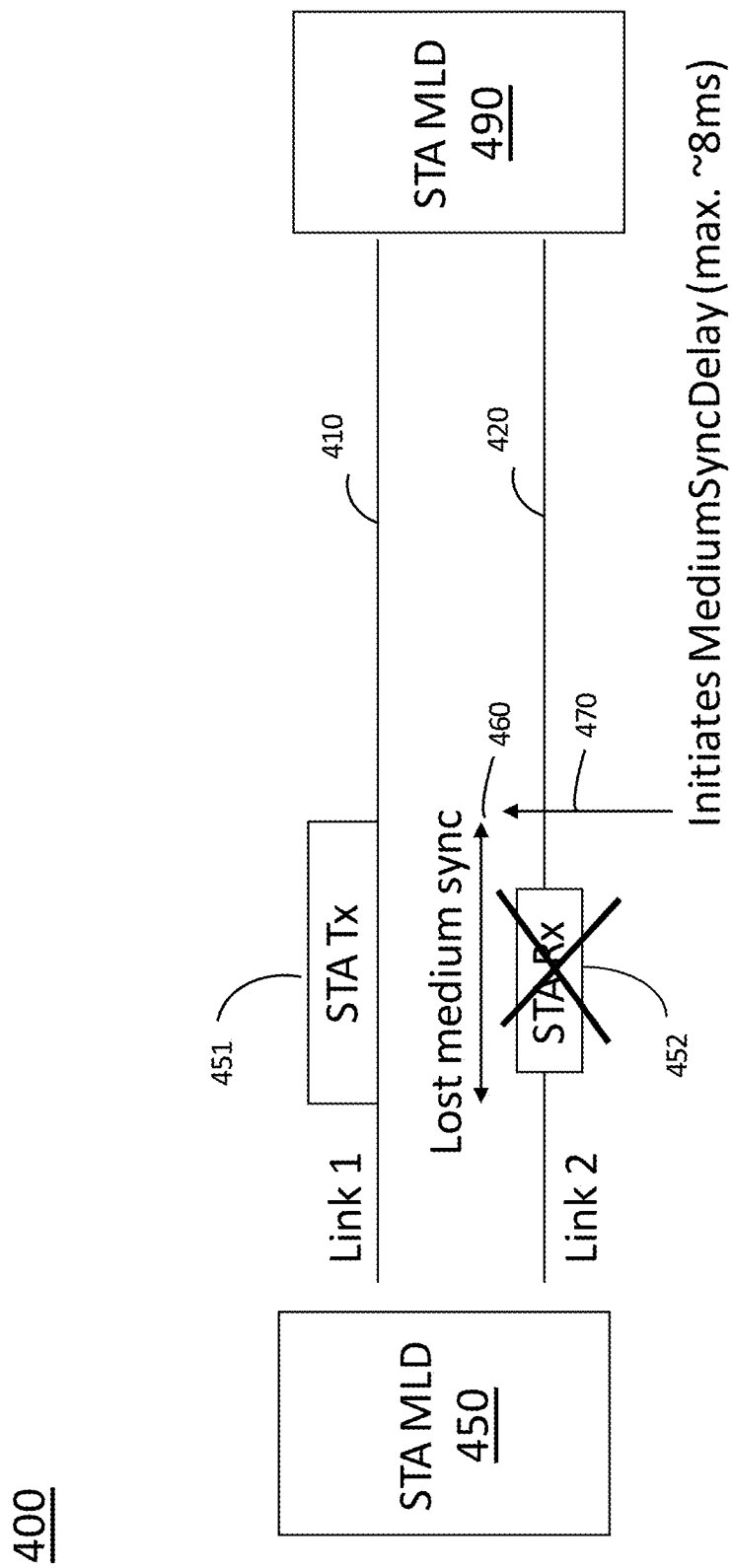
FIG. 4 is a diagram of communicating over multiple wireless links between a pair of STAs in an NSTR MLD, according to an example implementation of the present disclosure.

For example, FIG. 4 is a diagram depicting communication over multiple wireless links between a pair of STAs in an NSTR MLD. Referring to FIG. 4, a first STA (e.g., first STA 450) affiliated with a non-AP MLD that belongs to a pair of NSTR links (e.g., first link 410 and second link 420) may be identified as having lost medium synchronization on the second link when the second STA affiliated with the same MLD transmits a packet (e.g., TX packet 451) to the other STA MLD (e.g., second STA 490), which belongs to the same link pair, on the first link, and the second STA transmits a PPDU of a packet (e.g., RX packet 452) on the first link. As the loss of medium synchronization (or medium blindness) is identified, the duration of medium blindness on the second link for the first STA may be defined as a duration of lost medium synchronization (e.g., duration 460). In the duration of lost medium synchronization, the first STA cannot receive or decode the RX packet on the second link so that the two links cannot operate at the same time. If (1) it is not subject to the exception that both STAs end a transmission at the same time and (2) that transmission event (e.g., transmission of TX packet 451) is longer than a medium synchronization threshold, the first STA 450 may start or initiate a medium synchronization delay timer at the end of that transmission event (e.g., at time 470).

In some implementation of the medium access recovery procedure, a maximum value of MediumSyncDelay is 8.2 ms (e.g., defined as an 8 bit field called medium synchronization duration), implying that the first STA's wait time (e.g., for potentially recovering access to the medium) is approximately 8 ms after the end of the transmission on the other link (e.g., the first link). For a STA which runs a latency sensitive application, this wait time may be undesirable or unacceptable.

To solve these problems, according to certain aspects, embodiments in the present disclosure relate to techniques for preventing a first STA in a first MLD (e.g., NSTR MLD) from losing medium synchronization in communication with a second MLD (as a second STA or an AP), when the first STA affiliated to the first MLD transmits a wireless packet (TX packet) to the second STA on a first link while receiving a wireless packet (RX packet) from the second STA on a second link, by (1) decoding a portion of a legacy preamble of the RX packet, (2) decoding a Transmit opportunity (TXOP) field of a preamble of the RX packet, and/or (3) decoding a portion of a MAC header of the RX packet (or decoding the whole RX packet). In some embodiments, a duration can be obtained by decoding a portion of the RX packet (or a preamble thereof), and an exception to the medium access recovery procedure may be applied such that the medium access recovery procedure is not carried out if the duration on the second link is greater than or equal to a remaining transmission duration of the TX packet on the first link or if the portion of the RX packet (or the preamble thereof) is received at or after the end of the transmission of the TX packet on the first link. Using the systems and methods described herein, the STA can avoid/bypass/skip a medium access recovery procedure (which may cause the STA to unnecessarily wait as long as 8.2 ms even after the end of the transmission of the TX packet), thereby improving the user experience in latency sensitivity applications.

In one approach, the STA may receive an RX packet on the second link and can decode a portion of a legacy preamble of the RX packet (e.g., a L-SIG preamble) to avoid a medium access recovery procedure. The STA may start receiving the RX packet on the second link either before, during, or even after a transmission of a (TX) packet on the first link. The STA on the second link may decode at least the legacy preamble of the RX packet including fields of L-STF (8 µs), L-LTF (8 µs), and/or L-SIG (4 µs) where L-SIG defines a PPDU duration of the RX packet.

In some embodiments, the STA may determine if (1) the PPDU duration of the RX packet on the second link is greater than or equal to a remaining TX duration on the first link, or (2) if the legacy preamble is received at or after the end of the transmission on the first link. If the condition (1) or condition (2) is satisfied, it may be determined that the STA does not lose medium access synchronization, and the STA may not be subject to a medium access recovery procedure. That is, if the condition (1) or condition (2) is satisfied, the STA may defer channel access until the end of the PPDU duration of the RX packet (decoded from the L-SIG field) it is receiving and can resume channel access and/or contention (e.g., as in baseline situation) without incurring a delay (e.g., MediumSyncDelay). In some embodiments, if the condition (1) or condition (2) is satisfied, the STA may reset a delay timer (e.g., MediumSyncDelay timer) to zero. If the PPDU duration of the RX packet is less than the remaining TX duration on the first link, the STA may perform a medium access recovery procedure by starting the delay timer (e.g., MediumSyncDelay timer) at the end of the transmission of the TX packet or wait for a new packet reception, because the STA cannot likely decode the next RX packet.

In one approach, the STA may receive an RX packet on the second link and can decode a TXOP field of a preamble of the RX packet (e.g., a preamble of a HE (High Efficiency) packet (e.g., for 802.11ax or WiFi 6) or a preamble of an EHT (Extremely High Throughput) packet (e.g., for 802.11be or WiFi 7)) to avoid a medium access recovery procedure. The STA may start receiving the RX packet on the second link either before, during, or even after a transmission of a (TX) packet on the first link. The STA on the second link may decode at least a portion of the preamble of the RX packet including (1) HE-SIG-A (WiFi 6) or (2) EHT-SIG (WiFi 7) where a TXOP field in HE-SIG-A or EHT-SIG defines the current TXOP duration.

In some embodiments, the STA may determine if (1) the TXOP duration of the RX packet on the second link (which may be greater than the PPDU duration of the RX packet) is greater than or equal to a remaining TX duration on the first link, or (2) if the HE/EHT preamble is received at or after the end of the transmission on the first link. If the condition (1) or condition (2) is satisfied, it may be determined that the STA does not lose medium access synchronization, and the STA may not be subject to a medium access recovery procedure. That is, if the condition (1) or condition (2) is satisfied, the STA may defer channel access until the end of the TXOP duration of the RX packet (decoded from HE-SIG-A or EHT-SIG) it is receiving and resume channel access and/or contention as in baseline without incurring a delay (e.g., MediumSyncDelay). In some embodiments, if the condition (1) or condition (2) is satisfied, the STA may reset a delay timer (e.g., MediumSyncDelay timer) to zero. If the TXOP duration of the RX packet is less than the remaining TX duration on the first link, the STA may initiate/perform a medium access recovery procedure by starting the delay timer (e.g., MediumSyncDelay timer) at the end of the transmission of the TX packet or wait for a new packet reception.

In one approach, the STA may receive an RX packet on the second link and can decode a Duration field of a medium control access (MAC) header of the RX packet to avoid a medium access recovery procedure. The STA may start receiving the RX packet on the second link either before, during, or even after a transmission of a (TX) packet on the first link. The STA on the second link may decode/inspect the RX packet including the Duration field of the MAC header where the Duration field may indicate the end time for the following packet or frame (e.g., acknowledgment frame).

In some embodiments, the STA may determine if (1) a value in the Duration field of the RX packet on the second link (which may be less than the TXOP duration of the RX packet) is greater than or equal to a remaining TX duration on the first link, or (2) if the RX packet is received at or after the end of the transmission on the first link. If the condition (1) or condition (2) is satisfied, it may be determined that the STA does not lose medium access synchronization, and the STA may not be subject to a medium access recovery procedure. If the condition (1) or condition (2) is satisfied, the STA may set a network allocation vector (NAV) counter to the value in the Duration field of the RX packet, can defer channel access until the NAV counter is zero, and may resume channel access and/or contention (e.g., as in baseline situation) without incurring a delay (e.g., MediumSyncDelay). In some embodiments, when the NAV counter is zero, the STA may start counting down a backoff timer by a slot (which may be 9 µs for instance). In some embodiments, if the condition (1) or condition (2) is satisfied, the STA may reset a delay timer (e.g., MediumSyncDelay timer) to zero. If the value in the Duration field of the RX packet is less than the remaining TX duration on the first link, the STA may perform a medium access recovery procedure by starting the delay timer (e.g., MediumSyncDelay timer) at the end of the transmission of the TX packet or may wait for a new packet reception.

Another problem relates to avoiding/bypassing/skipping a medium access recovery procedure for eMLSR STAs because an eMLSR operation of a first STA (e.g., STA within an non-AP MLD) transmitting a frame on a first link may result in medium blindness for a second eMLSR STA (within the same non-AP MLD) in a second link so that the second STA affiliated to the same eMLSR MLD cannot receive or decode packets on the second link, and the two links cannot operate at the same time. This duration of medium blindness in one link (e.g., the other link) for a STA may be defined as a duration of lost medium synchronization. A medium access recovery can let/allow/enable the STA to come out of the medium blindness and access the medium again on the other link. A medium access recovery procedure may incur an unnecessary and significant delay (e.g., MediumSyncDelay) for the STA in an eMLSR STA to re-access the medium on the other link.

Figure 5A:
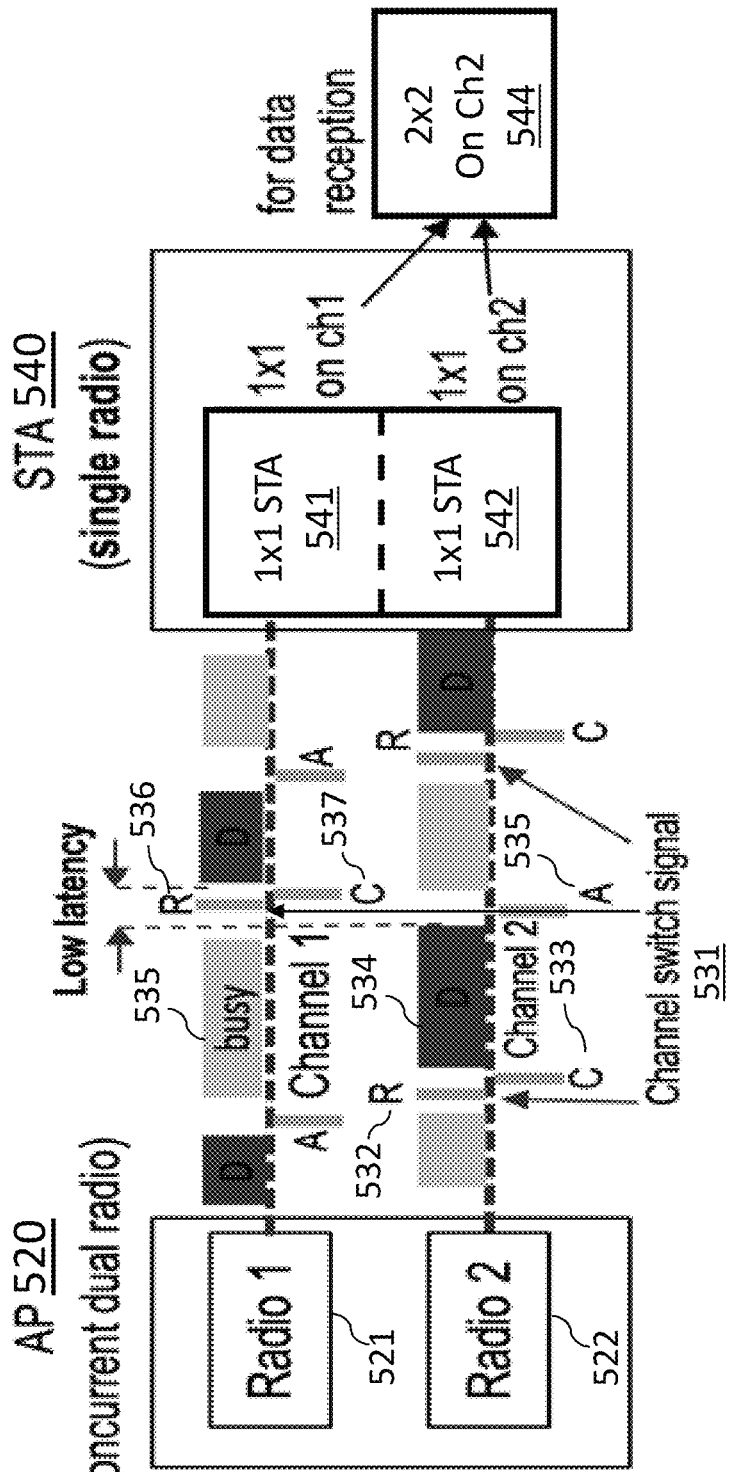
FIG. 5A and FIG. 5B are diagrams depicting communications over multiple wireless links between an AP MLD and a pair of STAs within a non-AP eMLSR MLD, according to example implementations of the present disclosure.
Figure 5B:
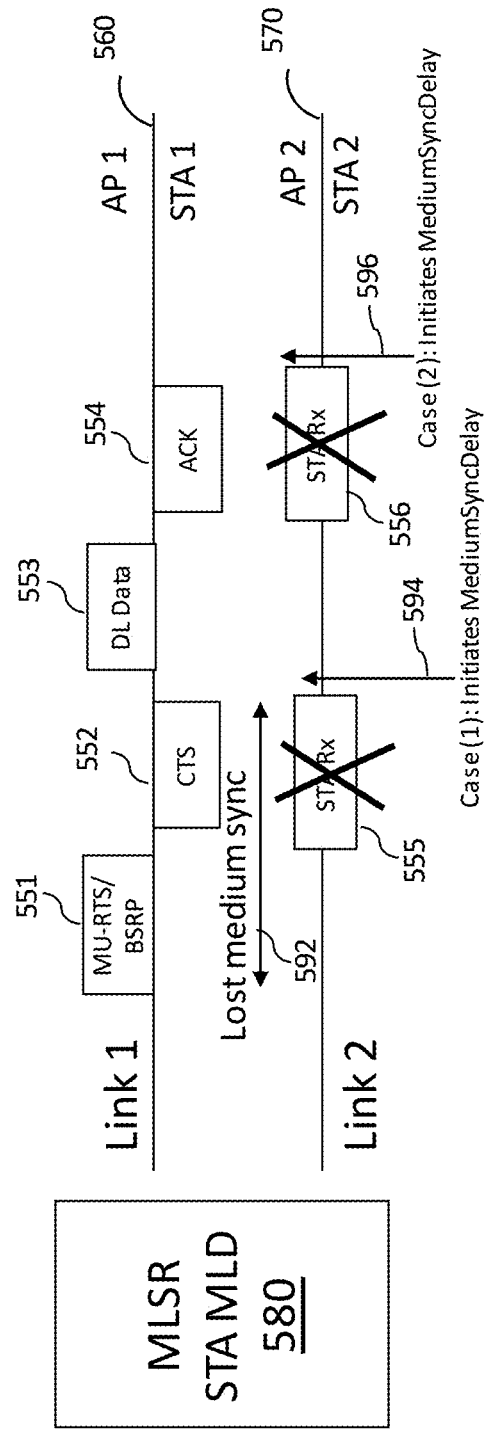

For example, FIG. 5A and FIG. 5B are diagrams depicting communications over multiple wireless links between an AP MLD and a pair of STAs within a non-AP eMLSR MLD. Referring to FIG. 5A, two STAs in an eMLSR MLD 540 (e.g., a non-AP MLD) may listen to (e.g., perform reception, detection and/or monitoring over) two (or more) pre-configured channels (e.g., channel 1, channel 2 as shown in FIG. 5A) simultaneously. For example, 2×2 (two transmit (TX) antennas and two receive (RX) antennas) Tx/Rx module 544 may be configured to include 1×1 STA on each channel/band (e.g. 1×1 STA 541 and 1×1 STA 542 for 5 GHz and 6 GHz) to listen to incoming packets on each channel. In some implementations, a 1×1 STA on one channel may add an extra 1×1 Rx on the other channel and can listen to two channels for incoming packets. Listening operations may relate to CCA (Clear Channel Assessment) and the STA in the non-AP MLD can receive an initial control frame of a frame exchange initiated by an AP 520 of an AP MLD which may have two radios 521, 522. The AP MLD may transmit a control frame (e.g. RTS 532) on any idle channel of the pre-configured channels (e.g., channel 2 in FIG. 5A) before a data frame transmission. The control frame may indicate to a non-AP MLD (STA 540 or STA 542) which channel is to be used for data transmission, and upon reception of the control frame, the STA 540 (or STA 542) may respond with a control frame (e.g. CTS 533). Data transmission 534 will follow the response (e.g. CTS 533) from the STA 542. After reception of a control frame on one link, the corresponding STA 542 in the non-AP MLD may receive a frame 534 on the same link SIFS (Short Interframe Space) time after the CTS 533. At this time, transmission or reception of frames on other enabled links (e.g., channel 1) may be prohibited (e.g., prohibited period 535). Upon transmission or reception of frames, after a switching delay initiated by a channel switch signal 531, the STAs 541, 542 within the non-AP MLD STA 540 may return to a listen mode immediately after end of frame exchange sequence (e.g., RTS 546 and CTS 537). In this manner, the Non-AP MLD and the AP MLD can exchange frames on one link at a time.

As shown in FIG. 5A, this eMLSR operation for the data transmission 534 on one channel (e.g., channel 2) may result in medium blindness for the 1×1 STA 541 (within the eMLSR STA 540) in other link (e.g., channel 1) so that the 1×1 STA 541 cannot receive or decode packets on the other link (e.g., channel 1) and the two links/channels cannot operate at the same time. This duration of medium blindness on channel 1 for the 1×1 STA 541 may be defined as a duration of lost medium synchronization. A medium access recovery can let the 1×1 STA 541 come out of the medium blindness and access the medium again on the other link. A medium access recovery procedure may incur an unnecessary and significant delay for the 1×1 STA to re-access the medium on the other link as shown in FIG. 5B.

Referring to FIG. 5B, an eMLSR STA MLD 580 may provide a first link 560 and a second link 570. One STA affiliated to the STA MLD 580 (e.g., STA1 on the first link 560) may not be able to decode any data on its link when the other STA (e.g., STA2 on the second link 570) transmits either a CTS/BSR (buffer status report) frame (e.g., CTS 551) solicited by an MU-RTS/BSRP frame (e.g., MU-RTS/BSRP 551) from its associated AP affiliated with AP MLD) or an acknowledgement (ACK) frame (e.g., ACK 554) in response to downlink (DL) PPDU (e.g., DL Data 553) from the same AP. In some embodiments, the STA2 on the second link 570 belonging to a link pair (e.g., pair of the first link 560 and the second link 570) may be considered to have lost medium synchronization (due to UL (uplink) interference) when the other station (e.g., STA1), which is affiliated with the same STA MLD 580 and belongs to that link pair, transmits/receives a PPDU (e.g., DL Data 553), except under the following condition: both STAs ended a transmission at the same time. Due to the UL interference, STA2 may not be able to receive data (e.g., RX data 555) on the second link 570 in the NSTR link pair. Here, STA 2 on the second link 570 may be considered to have lost medium synchronization and a medium access recovery procedure may be performed as follows. Based on the medium access recovery procedure, STA2 may be configured/required to initiate a MediumSyncDelay timer on the second link 570 at the end of the transmission from the AP 1 on the first link 560. In some implementations, STA2 would initiate the MediumSyncDelay timer on the second link 570 at the end of the CTS/BSR frame on the first link 560 (e.g., at time 594). In some implementations, STA2 would initiate the MediumSyncDelay timer on the second link 570 at the end of a successive UL transmission (e.g., ACK 554) following the DL Data 553 from the AP 1 (e.g., at time 596).

As shown in FIGS. 5A and 5B, a medium access recovery procedure may incur an unnecessary and significant delay for the eMLSR STA to re-access the medium on one link while performing a data transmission on the other link. In some implementation of the medium access recovery procedure, a maximum value of MediumSyncDelay is 8.2 ms (e.g., defined as an 8 bit field called medium synchronization duration), implying that the STA2's wait time is approximately 8 ms after the end of the transmission on the other link (e.g., the first link 560). For a STA which runs a latency sensitive application, this wait time may be undesirable or unacceptable.

To solve this problem, according to certain aspects, embodiments in the present disclosure relate to techniques for preventing a first device (as a first STA) within an eMLSR multi-link device (MLD) from losing medium synchronization in communication with a second MLD (as a second STA or an AP). In some embodiments, rules and/or procedures of a medium access recovery may be provided for an eMLSR STA or an NSTR Soft-AP MLD as well as for an AP MLD. Using the systems and methods described herein, a first STA on one link (e.g., STA 2 on the second link 570 in FIG. 5B) can avoid/bypass/skip a medium access recovery procedure which may cause the first STA to unnecessarily wait as long as 8.2 ms even after the end of the transmission of a TX packet on the other link (e.g., transmission of DL Data 553 in FIG. 5B), thereby improving the user experience in latency sensitivity applications.

In one approach, when a first STA affiliated with a non-AP MLD (e.g., eMLSR STA MLD) receives an MU-RTS or a BSRP frame on a first link of an NSTR link pair, a second STA affiliated to the same non-AP MLD on a second link of the NSTR link pair may determine if the second STA can decode a portion or the entirety of a PPDU it is receiving on the second link. If it is determined that the second STA cannot decode a portion or the entirety of the RX PPDU, the second STA may initiate (or may be required to initiate) a medium access recovery procedure after the end of transmission of an acknowledgement frame solicited by transmission of a data frame (e.g., DL PPDU) on the first link. In some embodiments, the medium access recovery procedure may be initiated by starting a delay timer (e.g., MediumSyncDelay timer). In some embodiments, The second STA may not be required to initiate the timer after the end of transmission of a CTS frame or a BSR frame, solicited by either an MU-RTS frame or a BSRP frame. The second STA may enter a doze state on the second link till the end of the transmission of the data frame on the first link and can wake up to receive the acknowledgement frame.

In some embodiments, when a first AP affiliated to an AP MLD is receiving from the first STA (1) a CTS/BSR frame solicited by the MU-RTS or BSRP frame transmitted from the first AP or (2) an acknowledgement frame on the first link solicited by a data frame (e.g., DL PPDU) from the from AP, a second AP affiliated to the same AP MLD may not transmit a data frame on the second link to the second STA (affiliated to the non-AP MLD to which the first STA is affiliated with) associated to the second AP. In some embodiments, the second AP may not transmit a data frame to the second STA on the second link till the expiration of the delay timer (e.g., MediumSyncDelay timer) following the transmission of the acknowledgement frame on the first link to the first AP affiliated to the same AP MLD.

In one approach, a STA (second STA) affiliated with an MLD may receive an RX packet on a second link and decode a portion of a legacy preamble of the RX packet (e.g., a L-SIG preamble) to avoid a medium access recovery procedure. The MLD may be an eMLSR STA MLD or an NSTR Soft AP MLD. The second STA may start receiving an RX packet on the second link either (1) before receiving an MU-RTS or BSRP frame on the first link, (2) during a frame exchange or a TXOP duration on the first link, or (3) after the transmission of an acknowledge frame on the first link. If the MLD is an NSTR Soft AP MLD, a soft-AP and a second STA may be affiliated with the NSTR Soft AP MLD. The second STA affiliated to the NSTR Soft AP MLD may start receiving an RX packet on the second link either (1) before a frame exchange or a TXOP duration on the first link, (2) during the frame exchange or the TXOP duration on the first link, or (3) after the transmission of a data frame (e.g., DL PPDU) to the Soft-AP affiliated to the same NSTR Soft AP MLD on the first link. The second STA on the second link may decode at least a legacy preamble of the RX packet including fields of L-STF (8 μs), L-LTF (8 μs), and/or L-SIG (4 μs) where L-SIG defines a PPDU duration of the RX packet.

In some embodiments, the second STA may determine if (1) the PPDU duration of the RX packet on the second link is greater than or equal to a remaining TXOP duration on the first link (for the eMLSR STA MLD), or (2) the PPDU duration of the RX packet on the second link is greater than or equal to a PPDU duration of the data frame on the first link (for the NSTR Soft AP MLD), or (3) if the legacy preamble of the RX packet is received on the second link at or after the end of transmission of an acknowledgement frame or a data frame on the first link. If the condition (1) or condition (2) or condition (3) is satisfied, it may be determined that the second TA does not lose medium access synchronization, and the second STA may not be subject to a medium access recovery procedure. That is, if the condition (1) or condition (2) or condition (3) is satisfied, the second STA may defer channel access until the end of the PPDU duration of the RX packet (decoded from the L-SIG field) it is receiving and resume channel access and/or contention (e.g., as in baseline situation) without incurring a delay (e.g., MediumSyncDelay). In some embodiments, if the condition (1) or condition (2) and/or condition (3) is satisfied, the second STA may reset a delay timer (e.g., MediumSyncDelay timer) to zero. If the PPDU duration of the RX packet on the second link is less than the remaining TXOP duration on the first link (for the eMLSR MLD), or (2) the PPDU duration of the RX packet on the second link is less than a PPDU duration of the data frame on the first link (for the NSTR Soft AP MLD), the second STA may initiate (or may be required to initiate) a medium access recovery procedure after the end of transmission of an acknowledgement frame solicited by transmission of a data frame (e.g., DL PPDU) on the first link. In some embodiments, the medium access recovery procedure may be initiated by starting a delay timer (e.g., MediumSyncDelay timer). In some embodiments, the second STA may not be required to initiate the timer after the end of transmission of a CTS frame or a BSR frame, solicited by either an MU-RTS frame or a BSRP frame. The second STA may enter a doze state on the second link till the end of the transmission of the data frame on the first link and can wake up to receive the acknowledgement frame.

In one approach, a STA (second STA) affiliated with an MLD may receive an RX packet on a second link and can decode/inspect a TXOP field of a preamble of the RX packet (e.g., a preamble of a HE (High Efficiency) packet (e.g., for 802.11ax or Wi-Fi 6) or a preamble of an EHT (Extremely High Throughput) packet (e.g., for 802.11be or Wi-Fi 7)) to avoid a medium access recovery procedure. The MLD may be an eMLSR MLD or an NSTR Soft AP MLD. The second STA may start receiving an RX packet on the second link either (1) before receiving an MU-RTS or BSRP frame on the first link, (2) during a frame exchange or a TXOP duration on the first link, or (3) after the transmission of an acknowledge frame on the first link. If the MLD is an NSTR Soft AP MLD, a soft-AP and a second STA may be affiliated with the NSTR Soft AP MLD. The second STA affiliated to the NSTR Soft AP MLD may start receiving an RX packet on the second link either (1) before a frame exchange or a TXOP duration on the first link, (2) during the frame exchange or the TXOP duration on the first link, or (3) after the transmission of a data frame (e.g., DL PPDU) to the Soft-AP affiliated to the same NSTR Soft AP MLD on the first link. The second STA on the second link may decode at least a portion of the preamble of the RX packet including (1) HE-SIG-A (Wi-Fi 6) or (2) EHT-SIG (Wi-Fi 7) where a TXOP field in HE-SIG-A or EHT-SIG defines the current TXOP duration.

In some embodiments, the second STA may determine if (1) the TXOP duration of the RX packet on the second link is greater than or equal to a remaining TXOP duration on the first link (for the eMLSR MLD), or (2) the TXOP duration of the RX packet on the second link is greater than or equal to a PPDU duration of the data frame on the first link (for the NSTR Soft AP MLD), or (3) if the HE/EHT preamble of the RX packet on the second link is received at or after the end of transmission of an acknowledgement frame or a data frame on the first link. If the condition (1) or condition (2) and/or condition (3) is satisfied, it may be determined that the second STA does not lose medium access synchronization, and the STA may not be subject to a medium access recovery procedure. That is, if the condition (1) or condition (2) or condition (3) is satisfied, the second STA may defer channel access until the end of the TXOP duration of the RX packet (decoded from the HE-SIG-A/EHT-SIG field) it is receiving and resume channel access and/or contention as in baseline without incurring a delay (e.g., MediumSyncDelay). In some embodiments, if the condition (1) or condition (2) or condition (3) is satisfied, the STA may reset a delay timer (e.g., MediumSyncDelay timer) to zero. If the TXOP duration of the RX packet on the second link is less than the remaining TXOP duration on the first link (for the eMLSR STA MLD), or (2) the TXOP duration of the RX packet on the second link is less than a PPDU duration of the data frame on the first link (for the NSTR Soft AP MLD), the second STA may initiate (or may be configured to initiate) a medium access recovery procedure after the end of transmission of an acknowledgement frame solicited by transmission of a data frame (e.g., DL PPDU) on the first link. In some embodiments, the medium access recovery procedure may be initiated by starting a delay timer (e.g., MediumSyncDelay timer). In some embodiments, The second STA may not be required to initiate the timer after the end of transmission of a CTS frame or a BSR frame, solicited by either an MU-RTS frame or a BSRP frame. The second STA may enter a doze state on the second link till the end of the transmission of the data frame on the first link and wake up to receive the acknowledgement frame.

In one approach, a STA (second STA) affiliated with an MLD may receive an RX packet on a second link and can decode/inspect/read a Duration field of a MAC header of the RX packet to avoid a medium access recovery procedure.

The MLD may be an eMLSR MLD or an NSTR Soft AP MLD. The second STA may start receiving an RX packet on the second link either (1) before receiving an MU-RTS or BSRP frame on the first link, (2) during a frame exchange or a TXOP duration on the first link, or (3) after the transmission of an acknowledge frame on the first link. If the MLD is an NSTR Soft AP MLD, a soft-AP and a second STA may be affiliated with the NSTR Soft AP MLD. The second STA affiliated to the NSTR Soft AP MLD may start receiving an RX packet on the second link either (1) before a frame exchange or a TXOP duration on the first link, (2) during the frame exchange or the TXOP duration on the first link, or (3) after the transmission of a data frame (e.g., DL PPDU) to the Soft-AP affiliated to the same NSTR Soft AP MLD on the first link. The second STA on the second link may decode including the Duration field of the MAC header where the Duration field may indicate the end time for the following packet or frame (e.g., acknowledgment frame).

In some embodiments, the second STA may determine if (1) a value in the Duration field of the RX packet on the second link (which may be less than the TXOP duration of the RX packet) is greater than or equal to a remaining TXOP duration on the first link (for the eMLSR MLD), or (2) the value in the Duration field of the RX packet on the second link is greater than or equal to a PPDU duration of the data frame on the first link (for the NSTR Soft AP MLD), or (3) if the RX packet is received on the second link at or after the end of transmission of an acknowledgement frame or a data frame on the first link. If the condition (1) or condition (2) or condition (3) is satisfied, it may be determined that the second STA does not lose medium access synchronization, and the STA may not be subject to a medium access recovery procedure. That is, if the condition (1) or condition (2) or condition (3) is satisfied, the second STA may set a NAV counter to the value in the Duration field of the RX packet, defer channel access until the NAV counter is zero, and resume channel access and/or contention as in baseline without incurring a delay (e.g., MediumSyncDelay). In some embodiments, when the NAV counter is zero, the second STA may start counting down a backoff timer by a slot (which may be 9 µs or other duration). In some embodiments, if the condition (1) or condition (2) or condition (3) is satisfied, the STA may reset a delay timer (e.g., MediumSyncDelay timer) to zero. If the value in the Duration field of the RX packet on the second link is less than the remaining TXOP duration on the first link (for the eMLSR MLD), or (2) the value in the Duration field of the RX packet on the second link is less than a PPDU duration of the data frame on the first link (for the NSTR Soft AP MLD), the second STA may initiate (or may be required/configured to initiate) a medium access recovery procedure after the end of transmission of an acknowledgement frame solicited by transmission of a data frame (e.g., DL PPDU) on the first link. In some embodiments, the medium access recovery procedure may be initiated by starting a delay timer (e.g., MediumSyncDelay timer). In some embodiments, The second STA may not be required/configured to initiate the timer after the end of transmission of a CTS frame or a BSR frame, solicited by either an MU-RTS frame or a BSRP frame. The second STA may enter a doze state on the second link till the end of the transmission of the data frame on the first link and wake up to receive the acknowledgement frame.

In one approach, a first device (e.g., non-AP NSTR STA or NSTR soft-AP) within a multi-link device (e.g., non-AP eMLSR MLD) having a plurality of wireless links including a first link and a second link, may include one or more processors. The one or more processors may receive a first frame (e.g., data frame) on the first link while communicating with a second device (e.g., another NSTR STA, an AP, a soft-AP) for transmission of a second frame (e.g., data frame (in NSTR STA scenarios) or RTS, MU-RTS (in eMLSR scenarios)) on the second link. The one or more processors may decode/inspect/read a portion of the first frame (e.g., legacy preamble, or TXOP field, or duration field in MAC header) to determine a first duration of no medium access. The one or more processors may determine, a second duration comprising a remaining transmission duration on the second link. The one or more processors may determine whether the first duration is greater than or equal to the second duration. In response to the first duration being greater than or equal to the second duration, the one or more processors may defer channel access on the first link until an end of the first duration.

In some embodiments, in response to the first duration being smaller than the second duration, the one or more processors may be configured to defer the channel access until after a predetermined time (e.g., 8 ms MediumSyncDelay) elapses from an end of the transmission of the second frame. In some embodiments, in response to the first duration being smaller than the second duration, the one or more processors may be configured to defer the channel access until an end of the transmission of the second frame and then initiate a medium access recovery process on the first link.

In some embodiments, the first duration may be a physical layer protocol data unit (PPDU) duration of a legacy preamble of the first frame. In some embodiments, the portion of the first frame may be a transmit opportunity (TXOP) field of the first frame. In some embodiments, the portion of the first frame may be a duration field of a medium access control (MAC) header of the first frame.

In some embodiments, in response to the first duration being greater than or equal to the second duration, or the portion being received at or after an end of the transmission of the second frame or an associated downlink or acknowledgement frame, the one or more processors may be configured to defer channel access on the first link until an end of the first duration.

In some embodiments, the second frame may include a clear-to-send frame or a buffer status report frame. The one or more processors may be configured to transmit an acknowledgment frame to the second device at or after an end of the transmission of the second frame. In response to the first duration being smaller than the second duration, the one or more processors may be configured to defer the channel access until after a predetermined time (e.g., 8 ms MediumSyncDelay) elapses from an end of the transmission of the acknowledgment frame. The one or more processors may be configured to transmit an acknowledgment frame to the second device at or after an end of the transmission of the second frame. In response to the first duration being smaller than the second duration, the one or more processors may be configured to defer the channel access until an end of the transmission of the acknowledgment frame and then initiate a medium access recovery process.

Embodiments in the present disclosure have at least the following advantages and benefits. Embodiments in the present disclosure can provide useful techniques for providing a mechanism for a STA in an MLD to avoid/bypass/skip a medium access recovery procedure (which causes the STA to unnecessarily wait as long as 8.2 ms even after the end of transmission of a TX packet), thereby improving the user experience in latency sensitivity applications.

Figure 6:
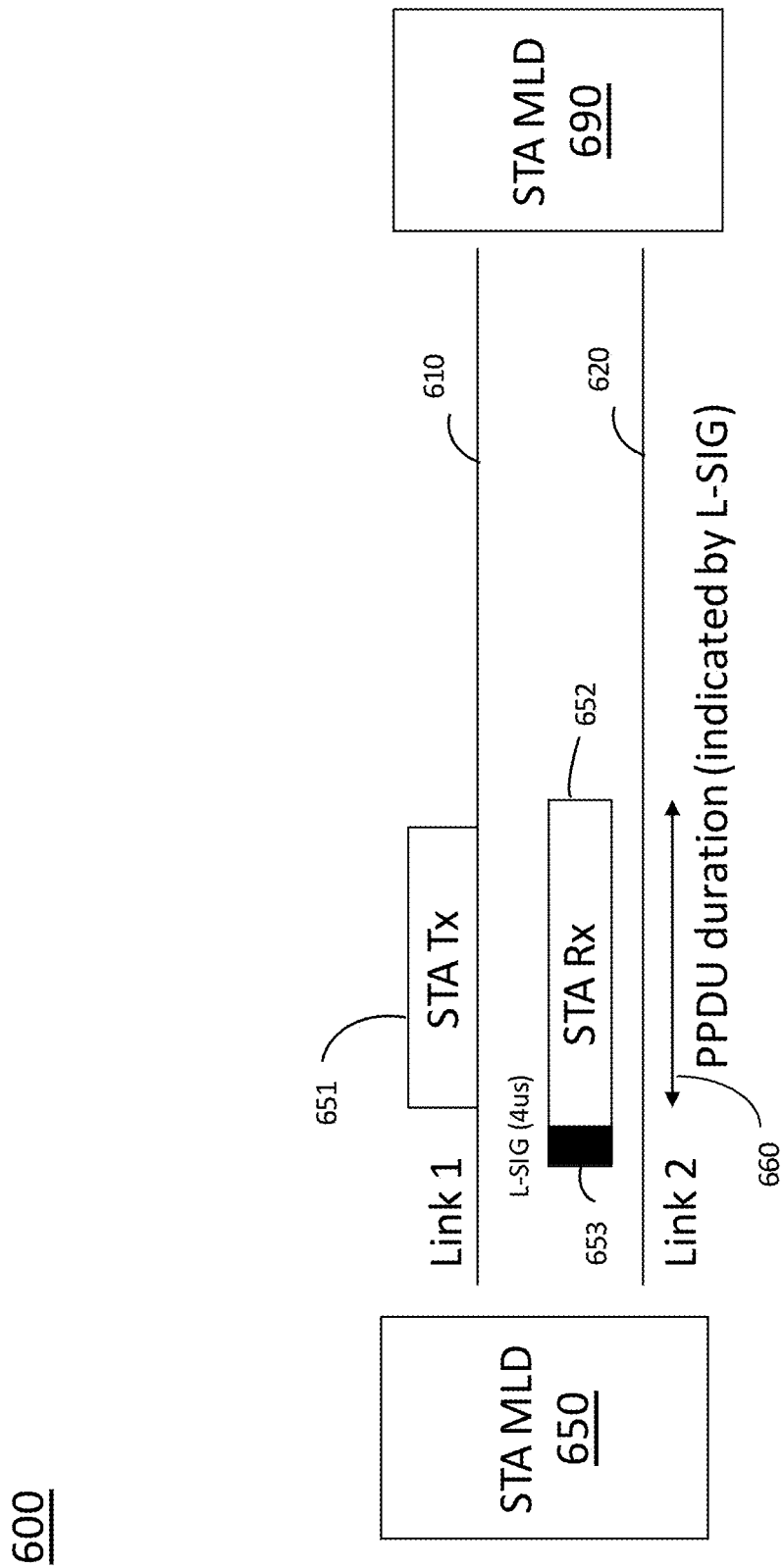
FIG. 6 is a diagram depicting communications over multiple wireless links between a pair of STAs in an NSTR MLD, according to a first embodiment of the present disclosure.

FIG. 6 is a diagram depicting communication over multiple wireless links between a pair of STAs in an NSTR MLD, according to a first embodiment of the present disclosure.

Referring to FIG. 6, a first STA (e.g., first STA MLD 650) may start receiving a wireless packet (e.g., RX packet 652) from a second STA (e.g., second STA MLD 690) on a second link (e.g., second link 620) of an NSTR link pair (e.g., first link 610 and second link 620), either before, during, or even after a transmission of a wireless packet (e.g., TX packet 651) on the first link. In some implementations, the second STA may be an AP MLD. The first STA may then decode/inspect/read/extract a portion of a preamble of the RX packet, and can obtain a first duration of no medium access from the portion of the preamble (e.g., duration 660). In the first embodiment, the preamble may be a legacy preamble, the portion decoded (e.g., the portion 653) may include at least one of L-STF (8 µs), L-LTF (8 µs), or L-SIG (4 µs), and the first duration may correspond to a physical layer protocol data unit (PPDU) duration of the RX packet.

Referring to FIG. 6, if the first STA determines that (1) the first duration is greater than or equal to the remaining duration of the transmission of the TX packet, or that (2) a legacy preamble of the RX packet is received at or after the end of the transmission on the first link, the first STA may (1) determine that the first STA does not lose medium access synchronization, (2) defer channel access until the end of the first duration (e.g., end of the PPDU duration), and/or (3) then resume channel access or contention while avoiding the medium access recovery procedure (e.g., of initiating a MediumSyncDelay wait time). For example, the first STA may not initiate the MediumSyncDelay wait time, or may initiate the MediumSyncDelay counter but set it to zero. If the first duration is smaller than the remaining duration of the transmission of the TX packet, because the first STA cannot likely decode a next RX packet due to self-interference, the first STA may perform a medium access recovery procedure (e.g., by causing the first STA to start a MediumSyncDelay timer at the end of the transmission of the TX packet if the transmission is longer than a MediumSyncThreshold threshold) or wait for a new packet reception.

Figure 7:
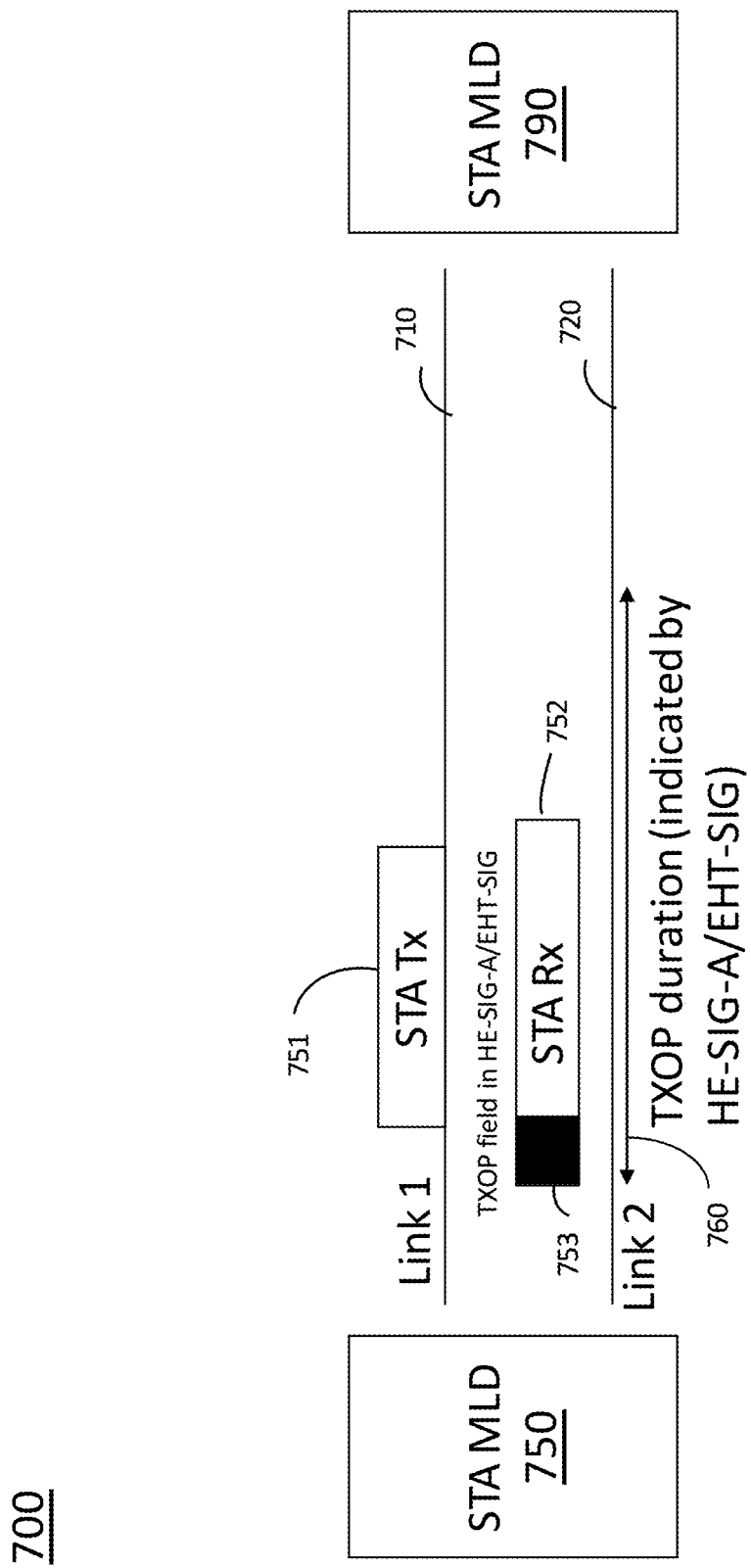
FIG. 7 is a diagram depicting communications over multiple wireless links between a pair of STAs in an NSTR MLD, according to a second embodiment of the present disclosure.

FIG. 7 is a diagram depicting communication over multiple wireless links between a pair of STAs in an NSTR MLD, according to a second embodiment of the present disclosure. Referring to FIG. 7, a first STA (e.g., first STA MLD 750) may start receiving a wireless packet (e.g., RX packet 752) from a second STA (e.g., second STA MLD 790) on a second link (e.g., second link 720) of an NSTR link pair (e.g., first link 710 and second link 720), either before, during, or even after a transmission of a wireless packet (e.g., TX packet 751) on the first link. In some implementations, the second STA may be an AP MLD. The first STA may then decode/read/inspect a portion of a preamble of the RX packet, and can obtain/determine a second duration of no medium access from the portion of the preamble (e.g., duration 760). In the second embodiment, the preamble may be a preamble of a HE (High Efficiency) packet (e.g., for 802.11ax or WiFi 6) or a preamble of an EHT (Extremely High Throughput) packet (e.g., for 802.11be or WiFi 7). The portion decoded (e.g., the portion 553) may include Transmit Opportunity (TXOP) in (1) HE-SIG-A (WiFi 6) or (2) EHT-SIG (WiFi 7), and TXOP may define a current TXOP duration. HE-SIG-A in an 802.11ax preamble or EHT-SIG in an 802.11be preamble may correspond to 12 µs, and the second duration obtained from (or as defined in) TXOP (e.g., a TXOP duration) may correspond to a duration of a next RX packet.

Referring to FIG. 7, if the first STA determines that (1) the second duration is greater than or equal to the remaining duration of the transmission of the TX packet, or that (2) an 802.11ax preamble or an 802.11be preamble of the RX packet is received at or after the end of the transmission on the first link, the first STA may (1) determine that the first STA does not lose medium access synchronization, may (2) defer channel access until the end of the second duration (e.g., end of TXOP duration), and/or may (3) then resume channel access or contention while avoiding the medium access recovery procedure (e.g., of initiating a MediumSyncDelay wait time). For example, the first STA may not initiate the MediumSyncDelay wait time, or may initiate the MediumSyncDelay counter but set it to zero. If the second duration is smaller than the remaining duration of the transmission of the TX packet, because the first STA cannot likely decode a next RX packet due to self-interference, the first STA may perform a medium access recovery procedure (e.g., by causing the first STA to start a MediumSyncDelay timer at the end of the transmission of the TX packet if the transmission is longer than a MediumSyncThreshold threshold) or wait for a new packet reception.

Figure 8:
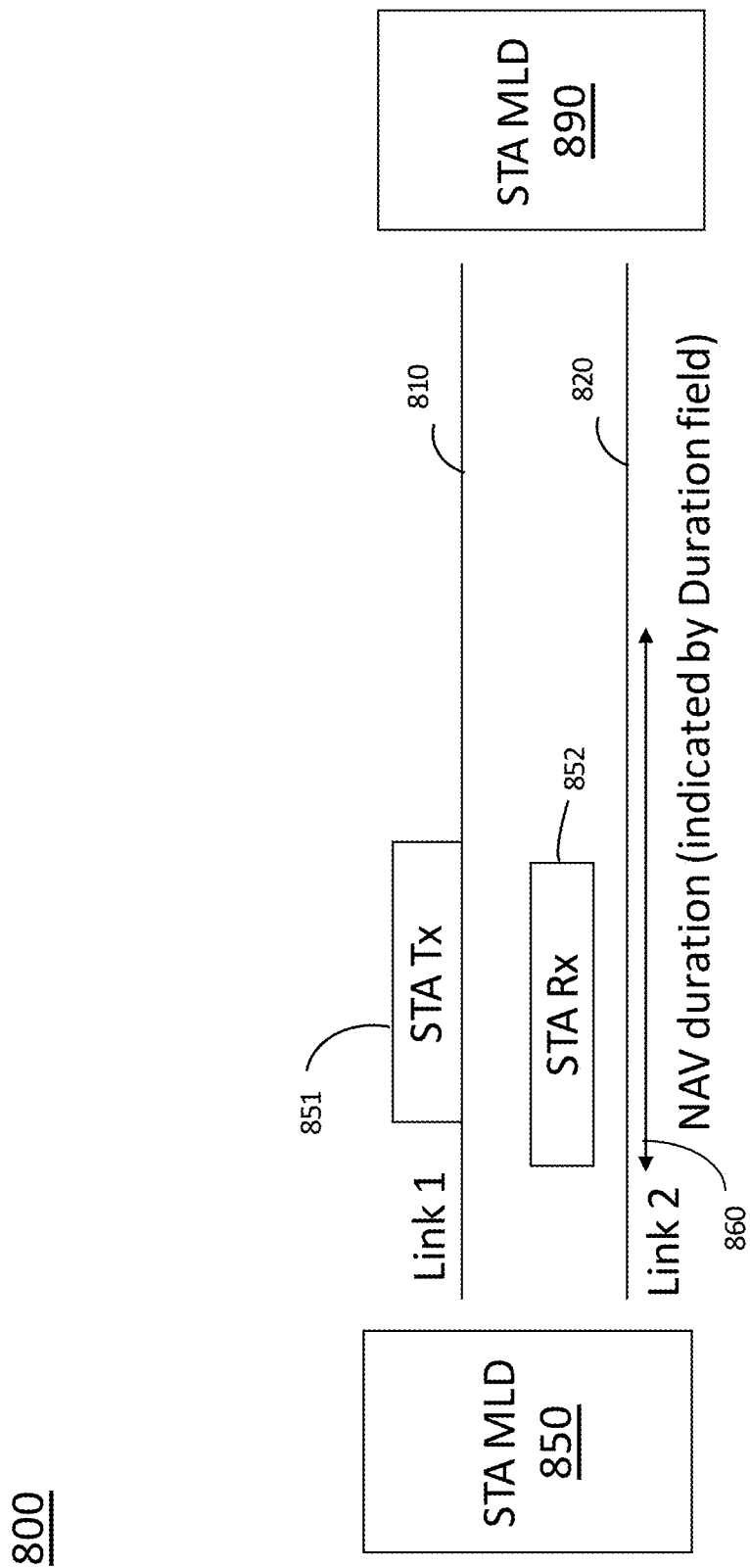
FIG. 8 is a diagram depicting communications over multiple wireless links between a pair of STAs in an NSTR MLD, according to a third embodiment of the present disclosure.

FIG. 8 is a diagram depicting communication over multiple wireless links between a pair of STAs in an NSTR MLD, according to a third embodiment of the present disclosure. Referring to FIG. 8, in some implementations, a first STA (e.g., first STA MLD 850) may start receiving a wireless packet (e.g., RX packet 852) from a second STA (e.g., second STA MLD 890) on a second link (e.g., second link 820) of an NSTR link pair (e.g., first link 810 and second link 820), either before, during, or even after the transmission of a TX packet (e.g., TX packet 851) on the first link. The first STA may then decode/read/inspect a medium control access (MAC) header of the RX packet, and obtain a third duration of no medium access from the MAC header (e.g., duration 860). The portion decoded may include a duration field in the MAC header (e.g., Duration in 802.11 MAC header), and the third duration may corresponds to a value in the duration field (e.g., network allocation vector (NAV) duration indicated by Duration field). In some implementations, a duration obtained from the duration field of a packet (as a third duration in the third embodiment) may be greater than or equal to a duration obtained from the TXOP field of the packet (as a second duration in the second embodiment).

Referring to FIG. 8, if the first STA determines that (1) the third duration is greater than or equal to the remaining duration of the transmission of the TX packet or that (2) the RX packet is (entirely) received at or after the end of the transmission of the TX packet, the first STA may (1) determine that the first STA does not lose medium access synchronization, may (2) set a back off counter, and/or may (3) resume channel access/contention after the counter completes. In some implementations, the back off counter may count down by a 9 µs slot. If the third duration is smaller than the remaining duration of the transmission of the TX packet, because the first STA cannot likely decode a next RX packet due to self-interference, the first STA may perform a medium access recovery procedure (e.g., by causing the first STA to start a MediumSyncDelay timer at the end of the transmission of the TX packet if the transmission is longer than a MediumSyncThreshold threshold) or wait for a new packet reception.

TABLE 1

Comparison Among Different Embodiments

| Embodiment | Time for Receiving Preamble or Header (Promptness) | Probability of Receiving Preamble or Header (Robustness) | Modulation Level (interference level, and detection level) | Strength of Preventing Lost Medium (Length of duration in which lost medium can be prevented) |
|---|---|---|---|---|
| First Embodiment (FIG. 5) | 20 μs (L-STF (8 μs), L-LTF (8 μs), L-SIG (4 μs)) | Highest | Lower modulation (lower interference, and higher detection) | Lowest (as long as a PPDU duration) |
| Second Embodiment (FIG. 6) | 32 μs (legacy preamble (20 μs), HE or EHT preamble (12 μs)) | Medium | Medium | Higher than Embodiment 1 (as long as until the end of a next packet transmission) |
| Third Embodiment (FIG. 8) | Time for receiving an entire packet | Lowest (e.g., probability of receiving the entire packet is less than those of receiving a preamble of the packet) | Higher modulation (higher interference, and lower detection) | Similar to or higher than Embodiment 2 (because a duration value from MAC header may be greater than a TXOP duration |

As shown in FIG. 5 to FIG. 8 and Table 1, a STA (e.g., first STA) may perform decoding to obtain (1) a PPDU duration from a legacy preamble of a packet in the first embodiment, (2) a TXOP duration from a HE preamble of an 802.11ax packet or an EHT preamble of an 802.11be packet in the second embodiment, and/or (3) a duration field value of a MAC header of a packet in the third embodiment.

In some embodiments, a STA may avoid a medium access recovery procedure by considering the PPDU duration (e.g., as first priority), the TXOP duration (e.g., as second priority), and/or the Duration field value (e.g., as third priority), according to their respective priorities based on robustness or promptness (see Table 1). For example, the STA may prefer/prioritize the PPDU duration (e.g., by deferring the channel access until the end of the PPDU duration), because the PPDU duration has a higher priority (higher robustness or promptness) over the TXOP duration or a Duration field value. In some embodiments, a STA may avoid a medium access recovery procedure according to priorities based on strength/effectiveness/probabilities of preventing lost medium and/or of decoding the PPDU duration/TXOP duration/the Duration field value For example, if a STA obtains both the PPDU duration and the TXOP duration, the STA may prefer/prioritize the TXOP duration (e.g., by deferring the channel access until the end of the TXOP duration) to/over the PPDU duration, because the TXOP duration can provide a longer duration in which lost medium can be prevented, than the PPDU duration.

Figure 9:
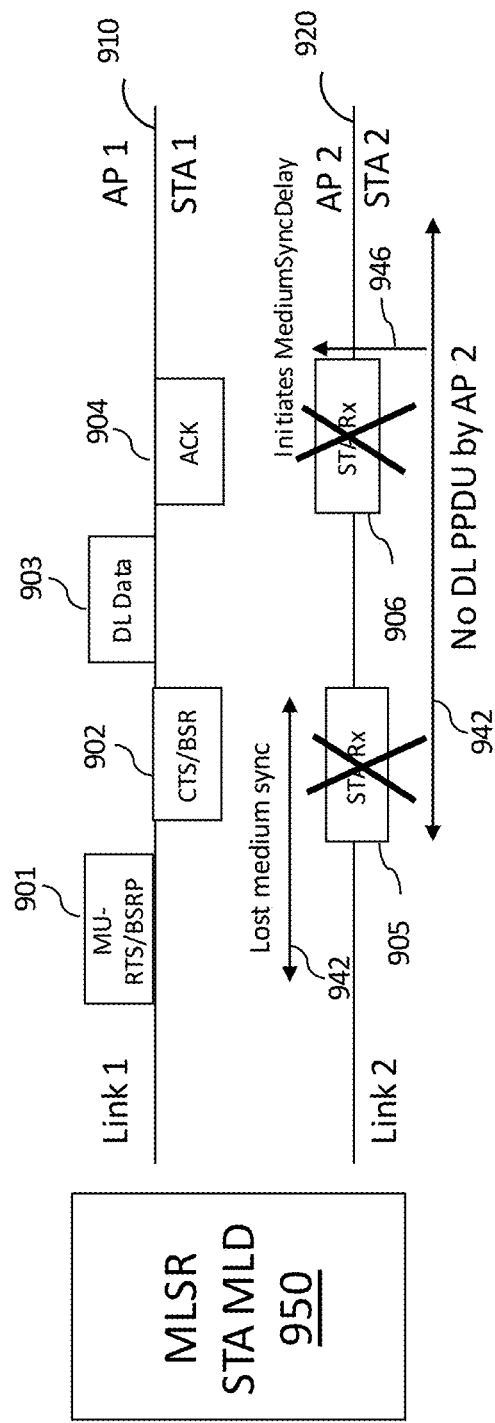
FIG. 9 is a diagram depicting communications over multiple wireless links between an AP MLD and a pair of STAs within a non-AP eMLSR MLD, according to a first embodiment of the present disclosure.

FIG. 9 is a diagram of communicating over multiple wireless links between an AP MLD (e.g., AP 1 and AP 2) and a pair of STAs (e.g., STA1 and STA2) within a non-AP eMLSR MLD 950, according to a first embodiment of the present disclosure. Referring to FIG. 9, when STA1 affiliated with the non-AP MLD 950 (e.g., eMLSR STA MLD) receives an MU-RTS or a BSRP frame 901 on a first link 910 of an NSTR link pair (e.g., pair of links 910 and 920), STA2 affiliated to the same non-AP MLD 950 on a second link 920 of the NSTR link pair may determine if the STA2 can decode a portion or the entirety of a PPDU 905 it is receiving on the second link 920. If it is determined that STA2 cannot decode a portion or the entirety of the RX PPDU 905, STA2 may determine a lost medium synchronization 942 and initiate (or may be required to initiate) a medium access recovery procedure after the end of transmission of an acknowledgement frame 904 solicited by transmission of a data frame 903 (e.g., DL PPDU) on the first link 910 (e.g., a medium access recovery may start at time 946). In some embodiments, the medium access recovery procedure may be initiated by starting a delay timer (e.g., MediumSyncDelay timer). In some embodiments, STA2 may not be required to initiate the timer after the end of transmission of a CTS frame or a BSR frame 902, solicited by either the MU-RTS frame or a BSRP frame 901. STA2 may enter a doze/sleep/low-power state on the second link 920 till the end of the transmission of the data frame 903 on the first link and can wake up to receive the acknowledgement frame 904.

In some embodiments, when AP 1 affiliated to an AP MLD (not shown) is receiving from STA1 (1) a CTS/BSR frame 902 solicited by the MU-RTS or BSRP frame 901 transmitted from AP 1 or (2) an acknowledgement frame on the first link 910 solicited by a data frame (e.g., DL PPDU 903) from the from AP 1, AP 2 affiliated to the same AP MLD may not transmit a data frame on the second link to STA2 (affiliated to the non-AP MLD to which the first STA is affiliated with) associated to AP 2 (e.g., no DL PPDU transmitted by AP 2 for a duration 942). In some embodiments, AP 2 may not transmit a data frame to STA2 on the second link till the expiration of the delay timer (e.g., MediumSyncDelay timer) following the transmission of the acknowledgement frame 904 on the first link 910 to AP 1 affiliated to the same AP MLD.

Figure 10:
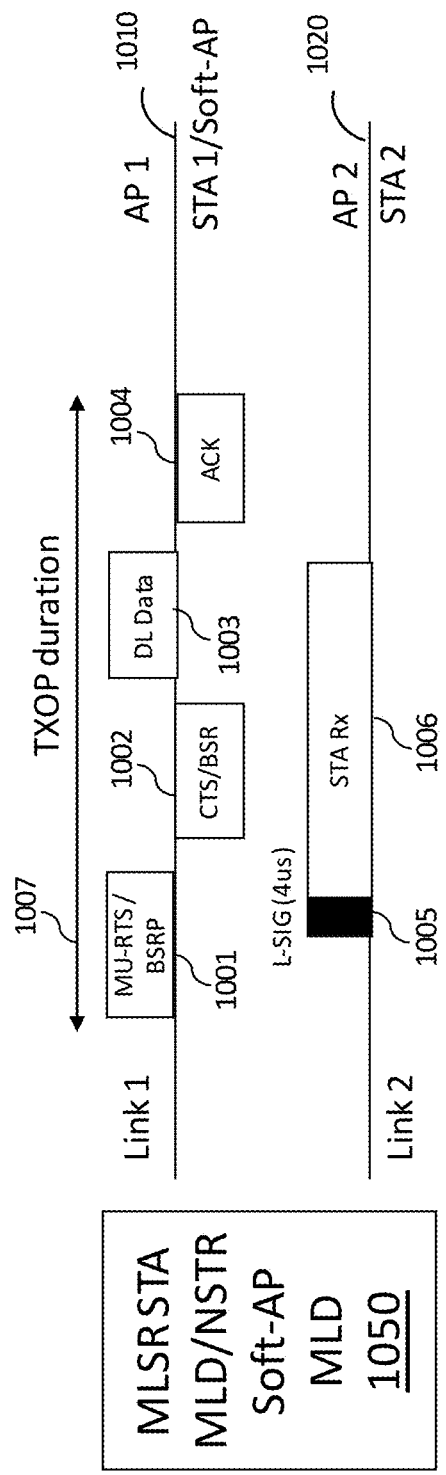
FIG. 10 is a diagram depicting communications over multiple wireless links between an AP MLD and a pair of STAs within a non-AP eMLSR MLD, according to a second embodiment of the present disclosure.

FIG. 10 is a diagram of communicating over multiple wireless links between an AP MLD (e.g., AP 1 and AP 2) and a pair of STAs (e.g., STA1 and STA2) within a non-AP MLD 1050, according to a second embodiment of the present disclosure. Referring to FIG. 10, STA2 affiliated with the MLD 1050 may receive an RX packet 1006 on a second link 1020 and can decode a portion of a legacy preamble of the RX packet (e.g., a L-SIG preamble 1005) to avoid a medium access recovery procedure. The MLD 1050 may be an eMLSR MLD or an NSTR Soft AP MLD. STA2 may start receiving an RX packet 1006 on the second link 1020 either (1) before receiving an MU-RTS or BSRP frame 1001 on the first link 1010, (2) during a frame exchange or a TXOP duration 1007 on the first link 910, or (3) after the transmission of an acknowledge frame 1004 on the first link 910. If the MLD 1050 is an NSTR Soft AP MLD, a soft-AP and STA2 may be affiliated with the NSTR Soft AP MLD 1050. STA2 affiliated to the NSTR Soft AP MLD 1050 may start receiving an RX packet 1006 on the second link 1020 either (1) before a frame exchange or a TXOP duration 1007 on the first link 1010, (2) during the frame exchange or the TXOP duration 1007 on the first link 1010, or (3) after the transmission of a data frame (e.g., DL PPDU) 1003 to the Soft-AP affiliated to the same NSTR Soft AP MLD 1050 on the first link 1010. STA2 on the second link 1020 may decode at least a legacy preamble of the RX packet 1006 including fields of L-STF (8 µs), L-LTF (8 µs), and L-SIG (4 µs) where L-SIG defines a PPDU duration of the RX packet.

In some embodiments, STA2 may determine if (1) the PPDU duration of the RX packet 1006 on the second link 1020 is greater than or equal to a remaining TXOP duration (of TXOP duration 1007) on the first link 1010 (for the eMLSR MLD), or (2) the PPDU duration of the RX packet 1006 on the second link 1020 is greater than or equal to a PPDU duration of the data frame 1003 on the first link 1010 (for the NSTR Soft AP MLD), or (3) if the legacy preamble of the RX packet 1006 is received on the second link 1020 at or after the end of transmission of an acknowledgement frame 1004 or the data frame 1003 on the first link 1010. If the condition (1) or condition (2) or condition (3) is satisfied, it may be determined that STA2 does not lose medium access synchronization, and STA2 may not be subject to a medium access recovery procedure. That is, if the condition (1) or condition (2) or condition (3) is satisfied, STA2 may defer channel access until the end of the PPDU duration of the RX packet 1006 (decoded from the L-SIG field 1005) it is receiving and resume channel access and/or contention as in baseline without incurring a delay (e.g., MediumSyncDelay). In some embodiments, if the condition (1) or condition (2) or condition (3) is satisfied, STA2 may reset a delay timer (e.g., MediumSyncDelay timer) to zero. If the PPDU duration of the RX packet 1006 on the second link 1020 is less than the remaining TXOP duration (of TXOP duration 1007) on the first link 1010 (for the eMLSR MLD), or (2) the PPDU duration of the RX packet 1006 on the second link 1020 is less than a PPDU duration of the data frame 1003 on the first link 1010 (for the NSTR Soft AP MLD), STA2 may initiate (or may be required/configured to initiate) a medium access recovery procedure after the end of transmission of the acknowledgement frame 1004 solicited by transmission of the data frame 1003 (e.g., DL PPDU) on the first link 1010. In some embodiments, the medium access recovery procedure may be initiated by starting a delay timer (e.g., MediumSyncDelay timer). In some embodiments, STA2 may not be required/configured to initiate the timer after the end of transmission of a CTS frame or a BSR frame 1002, solicited by either an MU-RTS frame or a BSRP frame 1001. STA2 may enter a doze/sleep/low-power state on the second link 102 till the end of the transmission of the data frame 1003 on the first link 1010 and can wake up to receive the acknowledgement frame 1004.

Figure 11:
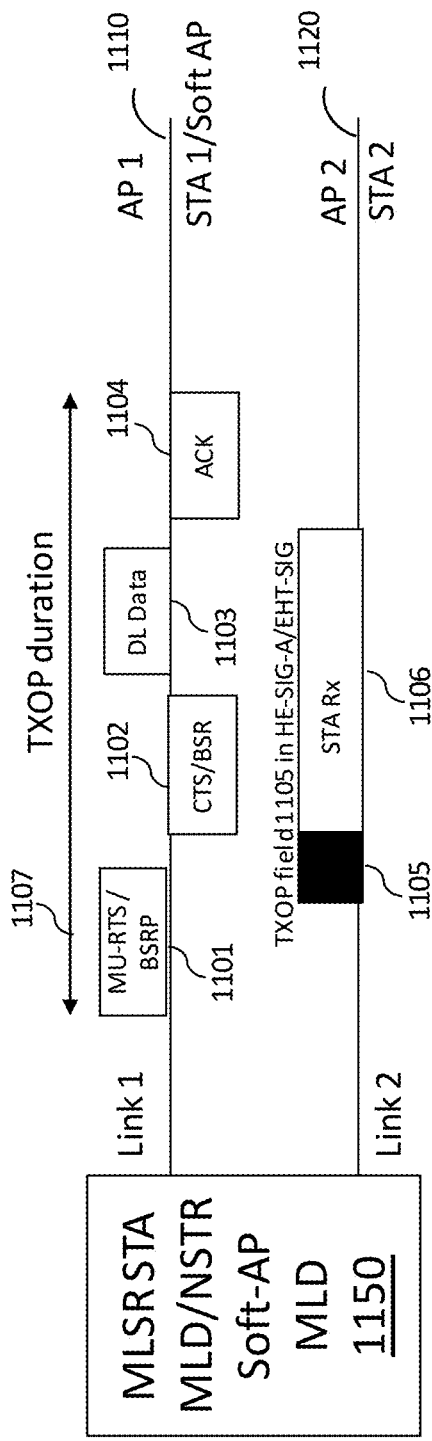
FIG. 11 is a diagram depicting communications over multiple wireless links between an AP MLD and a pair of STAs within a non-AP eMLSR MLD, according to a third embodiment of the present disclosure.

FIG. 11 is a diagram of communicating over multiple wireless links between an AP MLD (e.g., AP 1 and AP 2) and a pair of STAs (e.g., STA1 and STA2) within a non-AP MLD 1150, according to a third embodiment of the present disclosure. Referring to FIG. 11, STA2 affiliated with the MLD 1150 may receive an RX packet 1106 on a second link 1120 and can decode/inspect/access a TXOP field 1105 of a preamble of the RX packet (e.g., a preamble of a HE (High Efficiency) packet (e.g., for 802.11ax or Wi-Fi 6) or a preamble of an EHT (Extremely High Throughput) packet (e.g., for 802.11be or Wi-Fi 7)) to avoid a medium access recovery procedure. The MLD 1150 may be an eMLSR STA MLD or an NSTR Soft AP MLD. STA2 may start receiving an RX packet 1106 on the second link 1120 either (1) before receiving an MU-RTS or BSRP frame 1101 on the first link 1110, (2) during a frame exchange or a TXOP duration 1107 on the first link 1110, or (3) after the transmission of an acknowledge frame 1104 on the first link 1110. If the MLD 1150 is an NSTR Soft AP MLD, a soft-AP and STA2 may be affiliated with the NSTR Soft AP MLD 1150. STA2 affiliated to the NSTR Soft AP MLD may start receiving an RX packet 1106 on the second link 1120 either (1) before a frame exchange or a TXOP duration 1107 on the first link 1110, (2) during the frame exchange or the TXOP duration 1107 on the first link 1110, or (3) after the transmission of a data frame 1103 (e.g., DL PPDU) to the Soft-AP affiliated to the same NSTR Soft AP MLD 1150 on the first link 1110. STA2 on the second link 1120 may decode at least a portion of the preamble of the RX packet including (1) HE-SIG-A (WiFi 6) or (2) EHT-SIG (WiFi 7) where a TXOP field 1105 in HE-SIG-A or EHT-SIG defines the current TXOP duration of the RX packet 1106.

In some embodiments, STA2 may determine if (1) the TXOP duration of the RX packet 1106 on the second link 1120 is greater than or equal to a remaining TXOP duration (of TXOP duration 1107) on the first link 1110 (for the eMLSR MLD), or (2) the TXOP duration of the RX packet 1106 on the second link 1120 is greater than or equal to a PPDU duration of the data frame 1103 on the first link 1110 (for the NSTR Soft AP MLD), or (3) if the HE/EHT preamble of the RX packet 1106 on the second link 1120 is received at or after the end of transmission of an acknowledgement frame 1104 or a data frame 1103 on the first link 1110. If the condition (1) or condition (2) or condition (3) is satisfied, it may be determined that STA2 does not lose medium access synchronization, and STA2 may not be subject to a medium access recovery procedure. That is, if the condition (1) or condition (2) or condition (3) is satisfied, STA2 may defer channel access until the end of the TXOP duration of the RX packet 1106 (decoded from the HE-SIG-A/EHT-SIG field) it is receiving and can resume channel access and/or contention as in baseline situation without incurring a delay (e.g., MediumSyncDelay). In some embodiments, if the condition (1) or condition (2) or condition (3) is satisfied, STA2 may reset a delay timer (e.g., MediumSyncDelay timer) to zero. If the TXOP duration of the RX packet 1106 on the second link 1120 is less than the remaining TXOP duration on the first link 1110 (for the eMLSR MLD), or (2) the TXOP duration of the RX packet 1106 on the second link 1120 is less than a PPDU duration of the data frame 1103 on the first link 1110 (for the NSTR Soft AP MLD), STA2 may initiate (or may be required/configured to initiate) a medium access recovery procedure after the end of transmission of the acknowledgement frame 1104 solicited by transmission of the data frame 1103 (e.g., DL PPDU) on the first link 1110. In some embodiments, the medium access recovery procedure may be initiated by starting a delay timer (e.g., MediumSyncDelay timer). In some embodiments, STA2 may not be required/configured to initiate the timer after the end of transmission of a CTS frame or a BSR frame 1102, solicited by either the MU-RTS frame or BSRP frame 1101. STA2 may enter a doze/sleep/ low-power state on the second link 1120 till the end of the transmission of the data frame 1103 on the first link 1110 and can wake up to receive the acknowledgement frame 1104.

Figure 12:
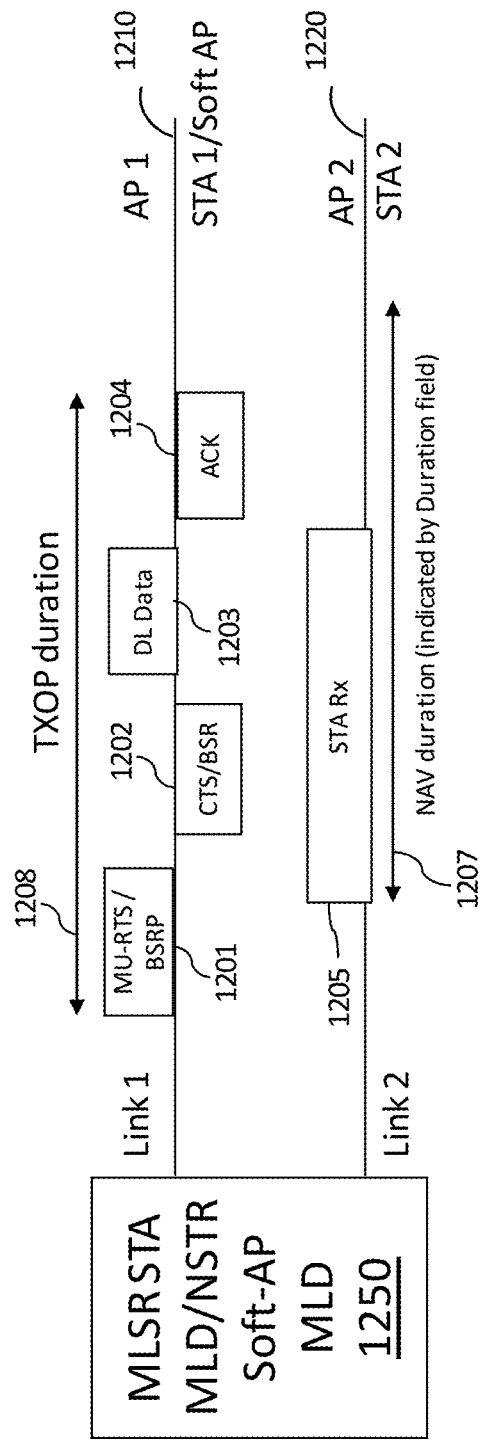
FIG. 12 is a diagram depicting communications over multiple wireless links between an AP MLD and a pair of STAs within a non-AP eMLSR MLD, according to a fourth embodiment of the present disclosure.

FIG. 12 is a diagram of communicating over multiple wireless links between an AP MLD (e.g., AP 1 and AP 2) and a pair of STAs (e.g., STA1 and STA2) within a non-AP MLD, 1250 according to a fourth embodiment of the present disclosure. Referring to FIG. 12, STA2 affiliated with the MLD 1250 may receive an RX packet 1205 on a second link 1220 and can decode a Duration field of a MAC header of the RX packet 1205 to avoid a medium access recovery procedure. The MLD 1250 may be an eMLSR STA MLD or an NSTR Soft AP MLD. STA2 may start receiving an RX packet 1205 on the second link 1220 either (1) before receiving an MU-RTS or BSRP frame 1201 on the first link 1210, (2) during a frame exchange or a TXOP duration 1208 on the first link 1210, or (3) after the transmission of an acknowledge frame 1204 on the first link 1210. If the MLD 1250 is an NSTR Soft AP MLD, a soft-AP and STA2 may be affiliated with the NSTR Soft AP MLD 1250. STA2 affiliated to the NSTR Soft AP MLD 1250 may start receiving an RX packet 1205 on the second link 1220 either (1) before a frame exchange or a TXOP duration 1208 on the first link 1210, (2) during the frame exchange or the TXOP duration 1208 on the first link 1210, or (3) after the transmission of a data frame 1203 (e.g., DL PPDU) to the Soft-AP affiliated to the same NSTR Soft AP MLD on the first link. STA2 on the second link 1220 may decode the Duration field of the MAC header of the RX packet 1205 where the Duration field may indicate the end time for the following packet or frame (e.g., acknowledgment frame).

In some embodiments, STA2 may determine if (1) a value in the Duration field of the RX packet 1205 on the second link 1220 (which may be less than the TXOP duration of the RX packet) is greater than or equal to a remaining TXOP duration (of TXOP duration 1208) on the first link 1210 (for the eMLSR MLD), or (2) the value in the Duration field of the RX packet 1205 on the second link 1220 is greater than or equal to a PPDU duration of the data frame 1203 on the first link 1210 (for the NSTR Soft AP MLD), or (3) if the RX packet 1205 is received on the second link 1220 at or after the end of transmission of an acknowledgement frame 1204 or the data frame 1203 on the first link 1210. If the condition (1) or condition (2) or condition (3) is satisfied, it may be determined that STA2 does not lose medium access synchronization, and STA2 may not be subject to a medium access recovery procedure. That is, if the condition (1) or condition (2) or condition (3) is satisfied, STA2 may set a NAV counter to the value in the Duration field of the RX packet, defer channel access until the NAV counter is zero (e.g., duration 1207), and resume channel access and/or contention as in baseline situation without incurring a delay (e.g., MediumSyncDelay). In some embodiments, when the NAV counter is zero, STA2 may start counting down a backoff timer by a slot (which may be 9 μs). In some embodiments, if the condition (1) or condition (2) or condition (3) is satisfied, STA2 may reset a delay timer (e.g., MediumSyncDelay timer) to zero. If the value in the Duration field of the RX packet 1205 on the second link 1220 is less than the remaining TXOP duration on the first link 1210 (for the eMLSR MLD), or (2) the value in the Duration field of the RX packet 1205 on the second link 1220 is less than a PPDU duration of the data frame 1203 on the first link 1210 (for the NSTR Soft AP MLD), STA2 may initiate (or may be required/configured to initiate) a medium access recovery procedure after the end of transmission of the acknowledgement frame 1204 solicited by transmission of the data frame 1203 (e.g., DL PPDU) on the first link 1210. In some embodiments, the medium access recovery procedure may be initiated by starting a delay timer (e.g., MediumSyncDelay timer). In some embodiments, STA2 may not be required/configured to initiate the timer after the end of transmission of a CTS frame or a BSR frame 1202, solicited by either the MU-RTS frame or BSRP frame 1201. STA2 may enter a doze state on the second link 1220 till the end of the transmission of the data frame 1203 on the first link 1210 and can wake up to receive the acknowledgement frame 1204.

Figure 13:
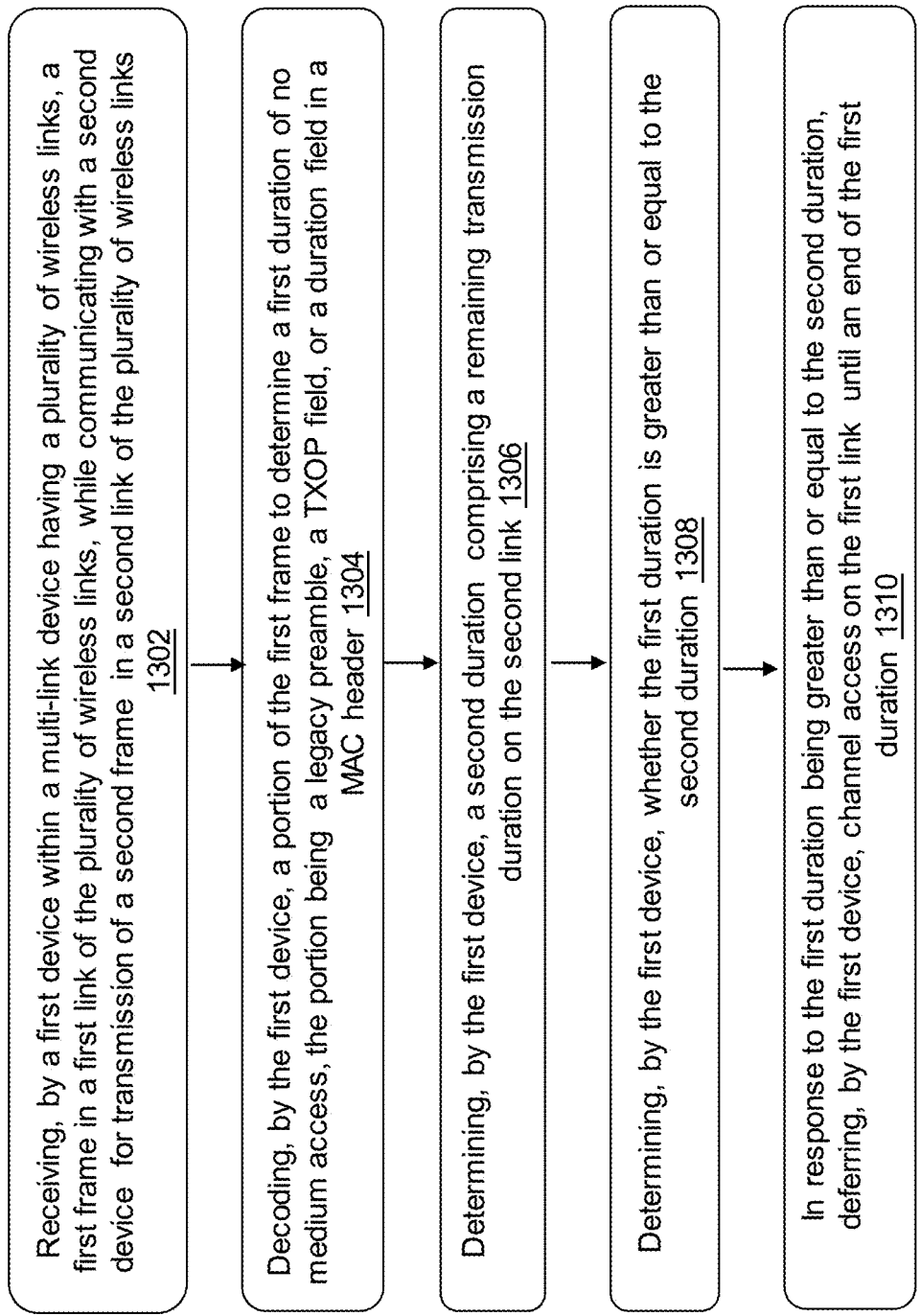
FIG. 13 is a flowchart showing a process of avoiding a medium access recovery procedure for non-simultaneous transmit and receive (NSTR) stations (STAs), according to an example implementation of the present disclosure.

FIG. 13 is a flowchart showing a process 1300 of avoiding a medium access recovery procedure for non-simultaneous transmit and receive (NSTR) stations (STAs), according to an example implementation of the present disclosure. In some embodiments, the process 1300 is performed by a first device (e.g., Console 110 or HWD 150 or non-AP MLD or AP MLD). In some embodiments, the process 1300 is performed by other entities. In some embodiments, the process 1300 includes more, fewer, or different steps than shown in FIG. 13.

In one approach, the first device (e.g., STA or soft-AP) within a multi-link device (e.g., MLD 650, 750, 850, 950, 1050, 1150, 1250) having a plurality of wireless links may receive 1302 a first frame in a first link (e.g., Link 2) of the plurality of wireless links, while communicating with a second device (e.g., MLD 690, 790, 890, or AP 1, AP 2) for transmission of a second frame (e.g., CTS/BSR, DL PPDU, ACK on Link 2) in a second link (e.g., Link 2) of the plurality of wireless links.

In some embodiments, the second frame may include a clear-to-send frame or a buffer status report frame (e.g., CTS/BSR 902, 1002, 1102, 1202). The first device may transmit an acknowledgment frame (e.g., ACK 904, 1004, 1104, 1204) to the second device at or after an end of the transmission of the second frame.

In one approach, the first device may decode 1304 a portion of the first frame to determine a first duration of no medium access (e.g., PPDU duration of RX packet on Link 2, TXOP duration of RX packet on Link 2, a value of Duration field of MAC header of RX packet on Link 2), the portion being a legacy preamble, a TXOP field, or a duration field in a MAC header. In some embodiments, the first duration may be a physical layer protocol data unit (PPDU) duration of a legacy preamble of the first frame (e.g., PPDU duration defined from L-SIG field). In some embodiments, the portion of the first frame may be a transmit opportunity (TXOP) field of the first frame (e.g., TXOP duration decoded from HE-SIG-A or EHT-SIG preamble). In some embodiments, the portion of the first frame may be a duration field of a medium access control (MAC) header of the first frame.

In one approach, the first device may determine 1306 a second duration including a remaining transmission duration on the second link (e.g., remaining TX duration of a data frame or remaining TXOP duration on Link 1). In one approach, the first device may determine 1308 whether the first duration is greater than or equal to the second duration. In one approach, in response to the first duration being greater than or equal to the second duration, the first device may defer 1310 channel access on the first link (e.g., Link 2) until an end of the first duration (e.g., PPDU duration of RX packet on Link 2, TXOP duration of RX packet on Link 2, a value of Duration field of MAC header of RX packet on Link 2).

In some embodiments, in response to the first duration being greater than or equal to the second duration, or the portion (e.g., L-SIG field, HE-SIG-A or EHT-SIG preamble, MAC header of RX packet on Link 2) being received at or after an end of the transmission of the second frame (e.g., CTS/BSR on Link 1) or an associated downlink (e.g., DL PPDU on Link 1) or acknowledgement frame (e.g., ACK on Link 1), the first device may defer channel access on the first link (e.g., Link 2) until an end of the first duration (e.g., PPDU duration of RX packet on Link 2, TXOP duration of RX packet on Link 2, a value of Duration field of MAC header of RX packet on Link 2).

In some embodiments, in response to the first duration being smaller than the second duration, the first device may defer the channel access until after a predetermined time (e.g., 8 ms MediumSyncDelay) elapses from an end of the transmission of the second frame (e.g., ACK on Link 2). In some embodiments, in response to the first duration being smaller than the second duration, the first device may defer the channel access until an end of the transmission of the second frame and may then initiate a medium access recovery process on the first link (e.g., Link 2).

In response to the first duration being smaller than the second duration, the first device may defer the channel access until after a predetermined time elapses from an end of the transmission of the acknowledgment frame (e.g., ACK 904, 1004, 1104, 1204). The first device may transmit an acknowledgment frame to the second device at or after an end of the transmission of the second frame (e.g., DL PPDU 903, 1003, 1103, 1203). In response to the first duration being smaller than the second duration, the first device may defer the channel access until an end of the transmission of the acknowledgment frame and then initiate a medium access recovery process.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A first device within a multi-link device having a plurality of wireless links including a first link and a second link, the first device comprising:
   one or more processors configured to:
      receive a first frame on the first link while communicating with a second device for transmission of a second frame on the second link;
      decode a portion of the first frame to determine a first duration of no medium access;
      determine, a second duration comprising a remaining transmission duration on the second link;
      determine whether the first duration is greater than or equal to the second duration; and
      in response to the first duration being greater than or equal to the second duration, defer channel access on the first link until an end of the first duration.

2. The first device according to claim 1, wherein the one or more processors are configured to:
in response to the first duration being smaller than the second duration, defer the channel access until after a predetermined time elapses from an end of the transmission of the second frame.

3. The first device according to claim 1, wherein the one or more processors are configured to:
in response to the first duration being smaller than the second duration, defer the channel access until an end of the transmission of the second frame and then initiate a medium access recovery process on the first link.

4. The first device according to claim 1, wherein the first duration is a physical layer protocol data unit (PPDU) duration of a legacy preamble of the first frame.

5. The first device according to claim 1, wherein the portion of the first frame is a transmit opportunity (TXOP) field of the first frame.

6. The first device according to claim 1, wherein the portion of the first frame is a duration field of a medium access control (MAC) header of the first frame.

7. The first device according to claim 1, wherein the one or more processors are configured to:
in response to the first duration being greater than or equal to the second duration, or the portion being received at or after an end of the transmission of the second frame or an associated downlink or acknowledgement frame, defer channel access on the first link until an end of the first duration.

8. The first device according to claim 1, wherein the second frame comprises a clear-to-send frame or a buffer status report frame.

9. The first device according to claim 8, wherein the one or more processors are configured to:
transmit an acknowledgment frame to the second device at or after an end of the transmission of the second frame; and
in response to the first duration being smaller than the second duration, defer the channel access until after a predetermined time elapses from an end of the transmission of the acknowledgment frame.

10. The first device according to claim 8, wherein the one or more processors are configured to:
transmit an acknowledgment frame to the second device at or after an end of the transmission of the second frame; and
in response to the first duration being smaller than the second duration, defer the channel access until an end of the transmission of the acknowledgment frame and then initiate a medium access recovery process.

11. A method comprising:
receiving, by a first device within a multi-link device having a plurality of wireless links, a first frame on a first link of the plurality of wireless links, while communicating with a second device for transmission of a second frame on a second link of the plurality of wireless links;
decoding, by the first device, a portion of the first frame to determine a first duration of no medium access;
determining, by the first device, a second duration comprising a remaining transmission duration on the second link;
determining, by the first device, whether the first duration is greater than or equal to the second duration; and
in response to the first duration being greater than or equal to the second duration, deferring, by the first device, channel access on the first link until an end of the first duration.

12. The method according to claim 11, comprising:
in response to the first duration being smaller than the second duration, deferring, by the first device, the channel access until after a predetermined time elapses from an end of the transmission of the second frame.

13. The method according to claim 11, comprising:
in response to the first duration being smaller than the second duration, deferring, by the first device, the channel access until an end of the transmission of the second frame and then initiate a medium access recovery process on the first link.

14. The method according to claim 11, wherein the first duration is a physical layer protocol data unit (PPDU) duration of a legacy preamble of the first frame.

15. The method according to claim 11, wherein the portion of the first frame is a transmit opportunity (TXOP) field of the first frame.

16. The method according to claim 11, wherein the portion of the first frame is a duration field of a medium access control (MAC) header of the first frame.

17. The method according to claim 11, comprising:
in response to the first duration being greater than or equal to the second duration, or the portion being received at or after an end of the transmission of the second frame or an associated downlink or acknowledgement frame, deferring, by the first device, channel access on the first link until an end of the first duration.

18. The method according to claim 11, wherein the second frame comprises a clear-to-send frame or a buffer status report frame.

19. The method according to claim 18, comprising:
transmitting, by the first device, an acknowledgment frame to the second device at or after an end of the transmission of the second frame; and
in response to the first duration being smaller than the second duration, deferring, by the first device, the channel access until after a predetermined time elapses from an end of the transmission of the acknowledgment frame.

20. The method according to claim 18, comprising:
transmitting, by the first device, an acknowledgment frame to the second device at or after an end of the transmission of the second frame; and
in response to the first duration being smaller than the second duration, deferring, by the first device, the channel access until an end of the transmission of the acknowledgment frame and then initiate a medium access recovery process.

* * * * *